United States Patent [19]
Hosoda et al.

[11] 3,812,225
[45] May 21, 1974

[54] METHOD OF MANUFACTURING FOAMED CROSS-LINKED POLYOLEFIN SLABS INVOLVING MULTIPLE EXPANSION TECHNIQUES AND DIRECT GAS PRESSURE

[75] Inventors: Kirokuro Hosoda; Naonori Shiina, both of Tokyo, Japan

[73] Assignee: The Furukawa Electric Company Limited, Tokyo, Japan

[22] Filed: Aug. 4, 1971

[21] Appl. No.: 169,037

Related U.S. Application Data

[60] Division of Ser. No. 778,443, Nov. 25, 1968, Pat. No. 3,651,183, which is a continuation-in-part of Ser. Nos. 442,523, March 24, 1965, abandoned, and Ser. No. 610,880, Jan. 23, 1967, abandoned, and Ser. No. 645,444, June 12, 1967, abandoned, and Ser. No. 792,180, Oct. 18, 1968, abandoned.

[52] U.S. Cl. ........... 264/54, 161/160, 260/2.5 E, 260/2.5 HA, 264/48, 264/55, 264/88, 264/236, 264/321, 264/DIG. 5, 264/DIG. 13, 264/DIG. 14, 264/DIG. 17, 264/DIG. 18
[51] Int. Cl. ........................................... B29d 27/00
[58] Field of Search ......... 264/54, 55, DIG. 18, 48, 264/88, 321, DIG. 5, DIG. 13, DIG. 14, DIG. 17; 260/2.5 E, 2.5 HA; 161/160

[56] References Cited
UNITED STATES PATENTS

| | | | |
|---|---|---|---|
| 2,216,834 | 10/1940 | Buskirk | 264/55 X |
| 3,098,831 | 7/1963 | Carr | 264/DIG. 18 |
| 3,098,832 | 7/1963 | Pooley et al. | 264/DIG. 18 |
| 2,283,316 | 5/1942 | Cooper et al. | 264/55 |
| 3,651,183 | 3/1972 | Hosoda et al. | 264/51 X |

*Primary Examiner*—Philip E. Anderson
*Attorney, Agent, or Firm*—Fleit, Gipple & Jacobson

[57] ABSTRACT

A method of manufacturing polymer foam of polyolefin, rubber, or plastics other than polyolefin, such as polyvinyl chloride, polystyrene, polyacrylic acid, or the like, or mixtures thereof, and particularly for manufacturing such foam in the form of a foamed slab or foamed sheet, is disclosed. The foamed slab is produced by extruding a matrix containing a cross-linking agent and blowing agent, subjecting the matrix to heat and pressure to decompose the blowing agent, and cross-linking agent, and thereafter heating the partially expanded matrix under atmospheric or other pressure to effect a secondary expansion. The foamed sheet is made by extruding a matrix containing a cross-linking agent and blowing agent and introducing same onto a support which contacts the surface of the matrix at a plurality of spaced locations to leave spaced regions of the matrix exposed, and thereafter subjecting the matrix to heat to cross-link and foam. A surface treatment for both the slab and sheet is provided to effect cross-linking of the surface regions prior to foaming.

21 Claims, 8 Drawing Figures

PATENTED MAY 21 1974 3,812,225

METHOD OF MANUFACTURING FOAMED CROSS-LINKED POLYOLEFIN SLABS INVOLVING MULTIPLE EXPANSION TECHNIQUES AND DIRECT GAS PRESSURE

CROSS-REFERENCE TO RELATED APPLICATIONS

This application is a divisional of application Ser. No. 778,443, filed Nov. 25, 1968, and now U.S. Pat. No. 3,651,183 entitled METHOD OF MANUFACTURING FOAMED BODY: which application is a continuation-in-part of application Ser. No. 442,523, filed Mar. 24, 1965, and now abandoned, entitled METHOD OF MANUFACTURING POLYOLEFIN COMPOSITION FOAMED BODY; Ser. No. 610,880, filed Jan. 23, 1967, and now abandoned, entitled METHOD OF MANUFACTURING FOAMED SHEETS OF POLYOLEFIN COMPOSITION; Ser. No. 645,444, filed June 12, 1967, and now abandoned, entitled METHOD OF MANUFACTURING POLYOLEFIN COMPOSITION FOAM; and Ser. No. 792,180 filed Oct. 18, 1968, and now abandoned, entitled METHOD FOR PRODUCING FOAM OF HIGH POLYMER.

BACKGROUND OF INVENTION MANUFACTURE OF FOAMED SLAB

Heretofore, great difficulty has been experienced in obtaining foam having a low density from polymer in commercial quantities at attractive costs. Although U.S. Pat. No. 3,098,831 British Pat. No. 899,389, and Japanese Pat. Application Publication No. 6,278/1966 describe methods for making foams having low densitites by forming cross-linkage between polyolefin molecules by an organic peroxide cross-linking agent, an azido cross-linking agent, or irradiation of ionization radiation to improve the viscoelastic property of the melt and then decomposing a blowing agent, none of these methods has achieved any wide-scale commercial usage.

The value of polymer foams having low densities is widely recognized by the art as the inherent properties of the foam are such as to make it suitable for extensive use as a building material, packing material, floating material, and agricultural material, as well as a host of others. Such a polymer foam is known to have the following features:

1. A wide scope of properties from flexibility to tenacity.
2. Excellent impact absorption and high elasticity. Even if compressing or bending is repeatedly experienced, the properties do not vary in this respect.
3. Lightness with fine cells and high heat insulation.
4. Low water absorption and moisture does not permeate.
5. Excellent oil resistance, chemical resistance, and weather resistance.
6. Excellent electric properties.

Despite knowledge of the foregoing, the art has been unable to develop commercial methods to manufacture thick foamed boards or slabs with a high degree of efficiency. Thick foamed board manufactured by a conventional known and presently available process exhibits differential expansion as between the surface regions and the interior, resulting in a lack of uniformity that produces coarse cells in the interior and also continuous cells (voids), whereas a foam having uniform and fine close cells is what the art requires. Furthermore, methods of manufacturing polymer thick foamed board has been described in several published patents, but none has been used commercially. For example, according to British Pat. No. 899,359 noted in the foregoing, polyethylene is improved by cross-linking by irradiation of ionization radiation or decomposition of organic peroxide and then the improved polyethylene is heated to a temperature higher than its softening temperature under a high pressure of nitrogen gas to enable the nitrogen gas to penetrate and be contained in the polyethylene. Thereafter, the polyethylene is cooled under pressure, after which the polyethylene is reheated to a temperature higher than the softening temperature and expanded due to the absorbed nitrogen, whereby a foam having a low density is obtained. Furthermore, this patent describes that in the production of the foamed board, small pieces of polyethylene composition are molded into a board having a thickness of about 10 mm by a hot press. However, the pressure of nitrogen gas required in this process is 1,000 to 12,000 lbs/in$^2$ (about 70 to 800 Kg/cm$^2$), a very high pressure, and further, it is necessary to leave the polyethylene under this high pressure for several hours. Accordingly, this process needs a particularly high pressure apparatus. All in all, the production efficiency is poor, and, therefore, this process is considered to be a poor technical solution to the problem at hand.

In another prior art proposal, as stated in U.S. Pat. No. 3,098,832, a polyethylene composition containing an organic peroxide and a blowing agent is loaded into a mold, and the mold closed and heated to effect the decomposition of the blowing agent and the cross-linking agent simultaneously while preventing the expansion completely. The cross-linked polymer containing the gas resulting from the decomposition of the blowing agent is cooled, solidified, and then removed from the mold. Subsequently, the molded polyethylene composition is reheated above its softening point and expanded, whereby polyethylene foam is obtained. The process of this patent, seeming to offer a plausible technical solution to the problem of producing polymer foam slabs or boards with high efficiency, has been carefully and thoroughly studied and checked and found to be still lacking in the following respects:

1. Because the polymer composition is heated in a closed mold, during which time the blowing agent decomposes and considerably increases the pressure in the mold, the mold must be capable of withstanding a particularly high pressure and must be completely airtight. Thus, a high installation cost is required, and the economics of production efficiency are adversely affected.

2. As described by this patent, pressure is applied by means of a hydraulic press which prevents expansion. Because the heat conductivity of polyethylene is low, heating cannot be effected uniformly. Therefore, the decomposition of the blowing agent will be non-uniform, and the pressure generated in the polymer tissue by the evolved gas will be considerably non-uniform. These factors will have an adverse effect upon the uniformity of the cellular structure and frequently will lead to the formation of voids.

3. In order to obtain a foam of a low density, a large amount of blowing agent is necessary. But when the blowing agent is decomposed, the pressure in mold is considerably increased, giving rise to a tendency to blow the composition out of the mold. This danger seems to be recognized in the patent as the description in the specification carefully notes that the amount of azobiscarbonamide added must be less than 15 parts by weight per 100 parts by weight of polyethylene, and, if a larger amount is added, a satisfactory foam cannot be obtained. The lower limit for the density of the foam obtained using the patented process is 0.03 g/cc.

4. As already noted, the blowing agent is decomposed without any expansion. Accordingly, the decomposition heat of the blowing agent accumulates in the interior of the composition mass, overheating the center portion, resulting in coarse cells and the formation of voids.

As described above, the known methods of manufacturing thick polymer foamed slabs or boards have several defects which make them unsuitable as efficient, economical commercial processes.

DETAILED DESCRIPTION OF INVENTION
MANUFACTURE OF FOAMED SLAB

The first aspect of the present invention consists in a method of manufacturing a polymer foamed slab which comprises mixing the polymer with a cross-linking agent and a blowing agent, molding the resulting composition into a matrix, heating the resulting matrix at an elevated temperature sufficient to decompose the cross-linking agent and the blowing agent under such a pressure that the matrix experiences a partial expansion, cooling the partially expanded matrix containing gaseous material trapped therein while maintaining the pressure so as to avoid further volumetric expansion, and thereafter effecting secondary (and, alternatively, tertiary) expansion of the partially expanded matrix by the entrapped gaseous material at a temperature above the softening point of the polymer. As a refinement, the surface of the matrix can be treated with heat to effect decomposition of the cross-linking agent in the surface region only prior to the primary expansion.

The present invention as applied to foamed slabs is different from previous known methods and can produce thick polymer foams, such as board or rod, commercially advantageously. The resulting foam has an excellent mechanical property; also, a foam having an extremely low density can be easily produced. The characteristics of products made by the present invention will be explained further in detail hereinafter.

According to the present invention, polymer is mixed with a cross-linking agent and a blowing agent homogeneously by Banbury mixer, a roll mill, or an extruder and then formed into powder, pellet, or flake, which is molded by a press or an extruder into a matrix without decomposing said cross-linking agent and blowing agent. The molding by means of a press is convenient in the case of small-scale production but is defective in that voids are liable to be formed in the interior; therefore, press molding is not the most effective or efficient way of producing the matrix. To minimize void formation, one must use a powdery composition when press molding, but this is undesirable from an economic standpoint as powdery composition is expensive.

On the other hand, when the matrix is fashioned by an extruder, the matrix does not contain voids, and efficiency of production is very high as compared to press molding. Therefore, extrusion is considered to be vastly superior by reason of the unexpectedly good results achieved respecting elimination of voids with all their attendant problems.

Heretofore, the prior art has taught that the thickness of polymer board, which can be extrusion molded is limited to about 6 mm and that if larger thicknesses are sought, voids are formed in the interior of the board. Accordingly, the art has refrained from extrusion molding of polymer board having a thickness greater than 6 mm because of the poor results noted. Hence, extrusion molding of polyolefin board having a thickness greater than 6 mm and containing a blowing agent, in addition to a cross-linking agent, is not known in the art. Also, it has never been anticipated by previous workers in the art that it is possible to produce a thick matrix having no defects (voids) by using an extruder.

It is necessary that, in the formation of the matrix according to the present invention, the blowing agent and cross-linking agent are not decomposed and neither voids nor defects are formed. The molding is generally effected at a temperature within the range of from about 70°C to about 200°C. The reason why the blowing agent must not be decomposed is based on the fact that if the blowing agent is decomposed and voids are formed in the obtained matrix, these voids are enlarged in the resulting foam and are highly objectionable.

The reason why the cross-linking agent must not be decomposed is based on the fact that if the cross-linking proceeds between polymer molecules in the extruder, the extrusion molding becomes excessively difficult.

As stated, the art has failed to date to suggest a technique whereby a thick board matrix can be formed without decomposing the cross-linking agent and the blowing agent and, further, without forming voids. However, it has been found that a thick and large matrix having no defect can be efficiently produced by proper selection of the extrusion conditions and even further facilitated by adding a low molecular weight substance to reduce the softening temperature of the polymer. Furthermore, it has been found that when this matrix is used, thick foam having uniform and fine cellular structure and no voids can be obtained.

Now, the step for effecting the partial or primary expansion by heating the matrix under pressure, while allowing expansion to decompose the blowing agent, will be explained. The imposition of a pressure can be effected mechanically such as by a press, hydraulically such as by a press, or environmentally by means of a gas such as nitrogen, carbon dioxide, or steam, or by a liquid which is inert to the composition.

The partial or primary expansion is effected by placing the matrix under a pressure of from about 3 to about 150 Kg/cm$^2$, and preferably from about 5 to about 50 Kg/cm$^2$ and heating said matrix to a temperature higher than the decomposition temperature of the cross-linking agent and the blowing agent. In this case the rate of expansion is 1.5 to 10 times of the original volume. It is not necessary that the matrix be placed in a mold, and, in case of board, it is sufficient only to place the matrix on a flat plate in a pressure-proof vessel, such as an autoclave. If the heating is effected in this manner, the cross-linking agent and the blowing agent are decomposed to form a partially expanded body having a similar shape to the matrix.

The pressure selected depends upon what is desired for the extent of the partial expansion of the matrix. In general, if the extent of the partial expansion is similar or slightly smaller than that of the secondary expansion, a satisfactory result can be obtained. For example, in order to expand finally the matrix to 30 times its original volume, if the partial expansion is effected to about 4 to 5 times the original volume of the matrix, and then the secondary expansion is effected to 6 to 7 times the volume of the partially expanded body, a thick foam having no defect can be obtained without forming cracks in the periphery. In other words, the extent of the partial expansion in this case is about 15 percent of the total expansion, and, in general, it is preferable that the partial expansion is 5 to 30 percent of the final volume.

When the pressure is applied by gas, pressure is applied uniformly, and even expansion occurs, and a finished foam characterized by uniform cells is obtained which is much better than anything heretofore known. Also, coarse cells and voids are totally absent.

Moreover, a pressure vessel provided with a multistage heating frame can be used, so that a large number of matrices can be treated in one operation, thereby increasing the efficiency of this step.

The gas to be used is preferably an inert gas which does not influence the composition at the decomposition temperature of the blowing agent, and nitrogen, carbon dioxide, or stream may be used. When a polyolefin is used, nitrogen is most preferable in view of low solubility against polyolefin.

The formation of the cross-linkage of polymer according to the invention must be effected prior to completion of the partial expansion, and, if a suitable formation of cross-linkage has not been effected prior to completion of the partial expansion, it is impossible to utilize the decomposed gas of the blowing agent effectively, and the cells in the resulting product become extremely coarse. On the other hand, if a suitable cross-linkage has been formed prior to completion of the partial expansion, it is possible to utilize the decomposed gas of the blowing agent effectively, and, further, a foam having uniform and fine cells and a similar shape to the matrix can be obtained.

Namely, the cross-linking in the present invention is carried out in the same step as the partial expansion, or prior to the partial expansion. When the cross-linking is effected prior to the partial expansion, it may be carried out, for example, by molding the composition by a press and subsequently raising the temperature of the press to effect cross-linking, or in an independent cross-linking step following matrix formation.

If, as the blowing agent, use is made of one having a higher decomposition temperature than the cross-linking agent and the matrix is firstly heated to a temperature at which the blowing agent is not decomposed, while the cross-linking agent is decomposed to form cross-linkage, and then the matrix is secondarily heated to a higher temperature at which the blowing agent is decomposed under a pressure to effect the partial expansion, the following advantages can be further attained:

1. The foam having very uniform and fine independent cells can be obtained.
2. The foam having a very low density can be obtained.
3. Voids and defects are few.
4. The foam having a very similar shape to the matrix can be obtained.
5. Efficiency of the blowing agent and the cross-linking agent is high.

The cross-linking is often effected by heating the matrix to a temperature at which the blowing agent is not decomposed, but only the cross-linking agent is decomposed, under atmospheric pressure or a higher pressure.

For example, if a mold is used and the cross-linking is carried out with a hydraulic press, no stresses or strains remain in the matrix upon removal from the press, and a cross-linked matrix having a desired correct dimension can be obtained. Subsequent foaming by decomposing the blowing agent in the cross-linked matrix under pressure to effect the partial expansion results in the foam having a completely similar shape to the matrix. This is extremely desirable and a great advantage since the size and shape of the product can be predetermined and the greatest usage can be obtained from the foamed products.

The formation of cross-linkage prior to the partial expansion as in this manner brings about a good result, but one must consider the extra expense of effecting the cross-linking subsequently to the molding or of providing an entirely independent cross-linking step.

The inventors have made detailed investigations with respect to this point and have found that a cross-linkage obtained by heating only the surface of the matrix to form a cross-linked crust on the surface has the same effect as when the cross-linkage is formed throughout the whole matrix. The reason why this is so is not completely understood but is presumably based on the fact that the formation of the cross-linked crust prevents the stickiness to the supports of the matrix and suppresses or inhibits too rapid partial expansion.

This surface cross-linkage can be formed by strongly heating the surface layer of the matrix by means of irradiation of infrared ray, electric heating, hot air heating, and the like for a very short time, for example, from about a few seconds to about 2 minutes, depending upon the polymer being treated, and the operation can be carried out continuously so that the cost incurred is very low.

In the surface cross-linkage treatment outlined, it is not necessary to heat the entire matrix but only to heat the upper and lower surfaces to raise the surface temperature from about 100°C to about 300°C, again depending upon the polymer. The foam thus obtained has a very strong surface layer.

Finally, the secondary expansion step, or the final step according to the present invention, will be explained.

The secondary expansion comprises cooling the composition after the partial expansion to a somewhat higher temperature than the softening temperature of the composition under a sufficient pressure to restrain the expansion and then lowering the pressure to expand the contained gas, or cooling the composition after the partial expansion to a lower temperature than the softening temperature of the composition under a sufficient pressure to restrain the expansion and then reheating the composition to a somewhat higher temperature than the softening temperature of the composition under atmospheric pressure or some other pressure to expand the contained gas.

If the expansion is effected directly by lowering the pressure while at a high temperature near the decomposition temperature of the blowing agent subsequent to the partial expansion, there are the following defects as compared with the invention:

1. If the pressure is lowered at a high temperature, overexpansion occurs, so that a high shrinkage occurs upon cooling; therefore, a foam having a low density cannot be obtained.
2. The cells in the resulting foam are coarse, and the rate of continuous cells increases.
3. The compression deflection of the resulting foam is high, and the tensile strength is low.
4. Vapor permeability, water absorption, and heat conductivity of the resulting foam increase.
5. On the surface of the resulting foam, cracks are formed, creases increase, and skin becomes thick.
6. The resulting foam deforms, and it is difficult to obtain a product having a similar shape to the matrix.
7. It takes a long time for cooling, and efficiency of the production is poor.
8. Overexpansion occurs, so that a large pressure-proof vessel having the volume corresponding to said overexpansion is required, and the installation cost increases; further, a large amount of high pressure gas is required.

It is preferable that the temperature to effect the secondary expansion is near the softening temperature of the composition insofar as possible, and, in general, said temperature is up to about 50°C higher than the softening temperature, preferably, up to about 30°C higher. Furthermore, this secondary expansion may be effected in a suitable mold to make a shaped article.

The secondary expansion is often carried out by cooling the partially expanded body to a lower temperature than the softening temperature of the composition under pressure and then reheating said cooled body to a higher temperature than the softening temperature of the composition under atmospheric pressure or some other pressure, and this process has the following advantages:

1. When the secondary expansion is also carried out in an apparatus for decomposing the blowing agent, a large and high pressure apparatus corresponding to the volume of the resulting foam is required, so that the installation cost is high.

On the other hand, when the partial expansion and the secondary expansion are effected in different installations, the partial expansion is performed in a small pressure vessel, while limiting the degree of expansion of the matrix under pressure, and the secondary expansion does not require use of a pressure vessel, so that the installation cost is low.

2. When the partial expansion and the secondary expansion are performed in the same vessel, frames for heating the matrix must have a broad space corresponding to the total expansion. Accordingly, it takes a long time to heat and cool the matrix, and a large amount of high pressure gas is required.

On the other hand, in this process, the degree or amount of the partial expansion is low so that the heating apparatus is small, and the heating and cooling of the matrix can be effected in a short time, and the efficiency is very high, and the consumption of the high pressure gas is small.

3. In this process, the foam having a low density such as 0.013 g/cc. can be easily manufactured.
4. In this process, the matrix after the partial expansion can be transported to a desired place and expanded by a simple apparatus, so that the transportation cost is saved.

Heating processes in the secondary expansion include, for example, hot air heating, steam heating, electric heating, etc. In the steam heating, creases are liable to be formed on the skin of the finished foam though the heating time is short. In the hot air heating, finished foam having a smooth and fine surface can be obtained.

The production method of the present invention as described above has the following features as compared with known and conventional processes in which the decomposition of the blowing agent and the expansion are performed simultaneously by heating under atmospheric pressure.

Namely, when the blowing agent is decomposed in the process of the present invention to generate the decomposed gas, the expansion is limited so that even if the blowing agent begins decomposition non-uniformly, the local expansion and deformation in the matrix do not occur to any significant extent. As the decomposition of the blowing agent proceeds, this local deformation is eliminated to form the partially expanded body having a similar shape to the matrix and uniform and fine independent cells, and then in a subsequent step, said body is subjected to the secondary expansion to obtain a finished foam having the following features:

1. The cells are very uniform and fine, such as 50 $\mu$ in the average diameter.
2. Cracks and voids are not formed, and the density reaches 0.013 g/cc.
3. A large and thick foam having a thickness of more than 70 mm is obtained.
4. A fine foam having a similar shape to the matrix is obtained.
5. The blowing agent and the cross-linking agent are utilized effectively.
6. The production is easy, and the products are uniform.
7. The compression deflection is low, and the tensile strength of the resulting foam is high.
8. Since the matrix after the partial expansion is cooled under pressure, the partially expanded body may be transported to a desired place, and the secondary expansion can be carried out by a simple installation, and the transportation cost of the foam can be considerably saved.

Although the present invention has excellent features as described above, it has the following additional features as compared with the conventional method, in which the composition is loaded into a mold and the cross-linking agent and the blowing agent are decomposed without expanding the composition:

1. In the noted conventional process, the density of foam is limited to about 0.03 g/cc., while in the process of the present invention, said density reaches about 0.013 g/cc., and a foam having a thickness of more than 70 mm can be obtained. This result is attained by separating the expansion process into two steps.
2. According to the method of the present invention, as the blowing agent is decomposed, the composition is subjected to the partial expansion. Accordingly, the heat generated by decomposition of the blowing agent is partially consumed by adiabatic expansion, so that the finished foam has fine and uniform cells, and no voids are obtained.

3. According to the present invention, the blowing agent is decomposed at a lower pressure than that of the conventional process, so that the installation cost is low.

4. When the pressure is applied by gas in the present invention, the pressure is applied uniformly and uneven expansion does not occur, and a finished foam having a uniformity of cells as has never previously been seen or known and having no coarse cells and voids can be easily obtained.

5. In the present invention, a pressure vessel provided with multistage heating frame can be used, so that a large number of matrices can be treated in one operation, and the efficiency is high.

6. In order to obtain a foam having a high density, it is not necessary to heat twice.

As described above, the characteristic of the present invention consists in separation of the expansion due to decomposition of the blowing agent into the partial expansion under pressure and the secondary expansion to be effected at a somewhat higher temperature than the softening temperature of the composition under atmospheric pressure or other pressure. Accordingly, not only a thick polymer foam having good properties can be manufactured commercially without using any expensive apparatus, but also foam having a low density, which has never previously been obtained, can now be easily obtained by the practice of the present invention.

For a better understanding of the invention, reference is taken to the following figures of the accompanying drawing wherein.

Figure 3A:
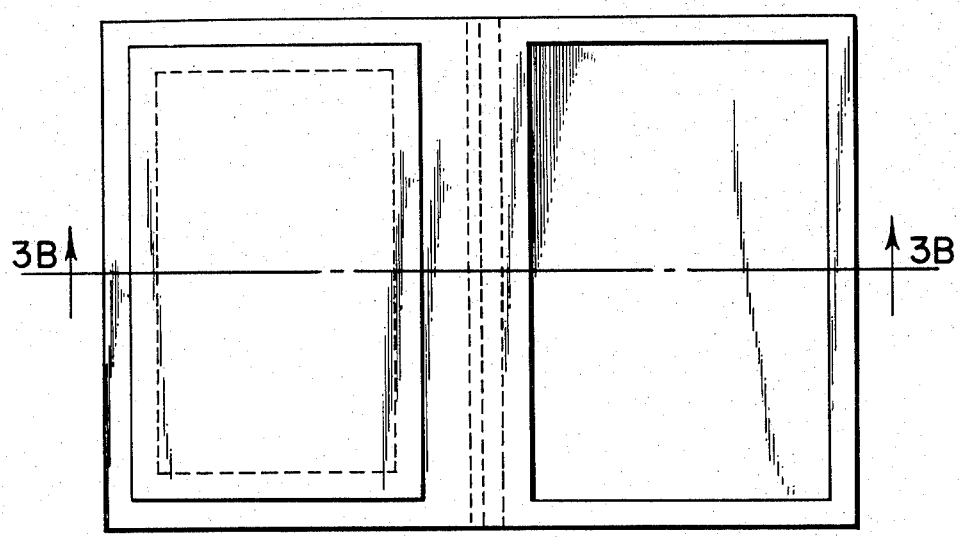
Figure 3B:
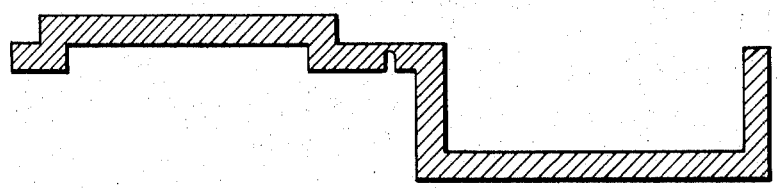
Figure 4:
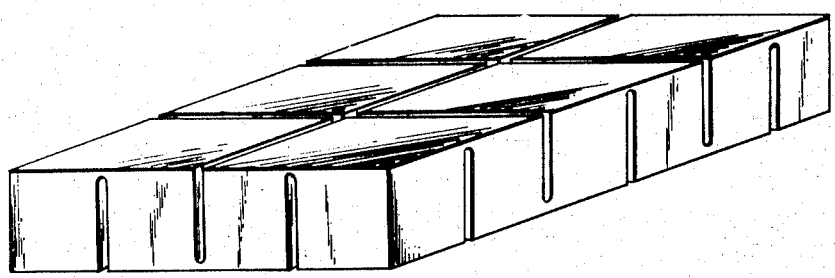

FIGS. 3-A and 3-B show a plan view and a sectional view of one embodiment of the shaped article made from the foam of the invention, respectively; and FIG. 4 shows a perspective view of one embodiment of the shaped article made from the foam of the invention.

Figure 1:
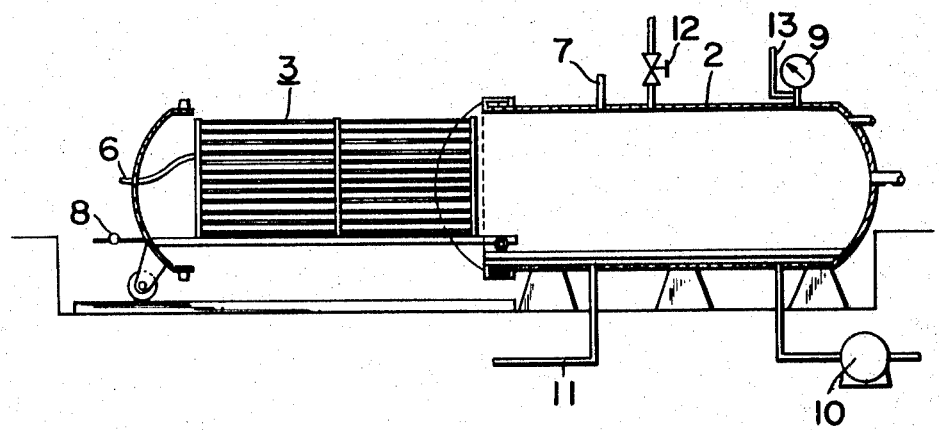
FIG. 1 shows a side view of one embodiment of the pressure-proof vessel used in the practice of the process according to the present invention.
Figure 2:
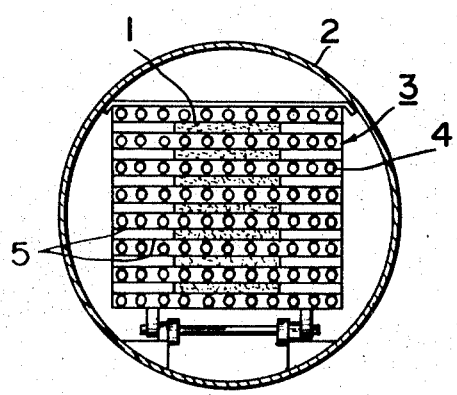
FIG. 2 shows a sectional view of the vessel as shown in FIG. 1.

Referring to FIGS. 1 and 2, the numeral 1 represents the matrix of the foam of the invention; 2 pressure-proof vessel; 3 frame; 4 steam pipe; 5 aluminum plate for supporting the matrix; 6 vapor inlet; 7 high pressure gas inlet; 8 vapor outlet; 9 pressure gage; 10 water feeding pump; 11 water discharging opening; 12 safety valve; and 13 high pressure gas outlet.

One embodiment for carrying out the method of the present invention will be explained referring to FIGS. 1 and 2.

The matrices 1 are mounted on the frame 3. A high pressure gas is introduced into the high pressure gas inlet 7, and then steam is introduced into the inlet 6, whereby matrices are heated. When the temperature of the composition reaches the decomposition temperature of the blowing agent, the blowing agent is decomposed and expansion occurs, but this expansion is limited by the gas pressure, and the complete expansion does not occur. After the decomposition, compressed water is supplied by the water feeding pump 10, while retaining the pressure, to cool the composition to a lower temperature than the softening point and then taken out from the pressure-proof vessel. The partially expanded body thus obtained is heated to a somewhat higher temperature than the softening temperature of the composition in a separate heating apparatus to effect the secondary expansion, whereby a desired foam can be obtained.

Pellets of two compositions having different components may be used for molding only by mixing without milling. When the two compositions are expanded, they do so at different rates, so that multi-colored and uneven foam can be manufactured.

The foams according to the invention can be subjected to an additional processing and can be formed easily into a desired shape by vacuum forming, or compression molding. The vacuum forming can be effected following the usual method for processing polystyrene paper to produce a shaped article having a thickness of about 10 mm. The compression molding of the foam according to the present invention comprises compressing one or more pieces of the foams to more than 20 percent from one direction, while heating these pieces at a higher temperature than the softening temperature of the composition, and then cooling while applying pressure. Moreover, a foreign material can be inserted between more than two pieces of foams and the assembly heated in a mold to a higher temperature than the softening temperature of the foam and compressed, and the molding can be effected as in the above-described manner.

When such a compression is carried out, the strength of the foam is considerably improved. Namely, in the foam thus molded, the rates of increase in the tensile strength and other mechanical properties are higher than those of increase in the density due to the compression.

Furthermore, upon such a molding, if thin and extremely compressed portions are formed in parts of foam as shown in FIGS. 3-A, 3-B, and 4, the molded products can be easily folded at this portion, and extremely strong folding portions can be formed, and, for example, said portion can endure 320,000 times of foldings. The density of the foam in this thin portion is, in general, 0.1 to 1.0 g/cc., and the thickness of the compressed portions is 0.2 to 2 mm. The foam container having such a thin portion in the center as shown in FIG. 3 has remarkably high heat insulation, water-proofness, cushionability and strength, so that said container can be used broadly for package.

When the foam according to the present invention is compressed while being heated within the range from room temperature to the softening temperature of the composition, the cells become flat by the compression, and the resulting foam having such cells has a remarkably excellent elasticity as compared with the original foam.

BACKGROUND OF INVENTION MANUFACTURE OF FOAMED SHEETS

In general, polymer has excellent physical, chemical, and electrical properties and can be colored in various beautiful colors and processed with ease, so that the use of polymer has recently increased considerably in various fields of industry. Accordingly, if foamed polymer having a low density can be manufactured with high efficiency, further improvements, such as excellent heat insulation, cushionability, and floatability can be provided, in addition to the above-described excellent properties, so that it is expected that said polymer can be extensively used for building and packing materials, etc.

As conventional methods of manufacturing foamed polymer of a low density, U.S. Pat. Nos. 3,067,147 and 3,098,831 have been known. The method of U.S. Pat. No. 3,067,147 comprises steps of impregnating molten polyolefin with soluble blowing agent at a high pressure, and expanding the impregnated polyolefin while extruding it by extruder, wherein the extent of expansion of the polyolefin is controlled, together with cell structure thereof, either by regulating the cooling condition thereof, or by radiating the polyolefin with ionizing radiation. Although the method of U.S. Pat. No. 3,067,147 is one of improved processes, it has such disadvantages that there is required an expensive device for generating radiation, and that, when no ionizing radiation is used, foamed products are poor in weather resistance and the cells are too large, so that heat insulating is low. Furthermore, according to this process, although foamed boards or rods can be easily produced, foamed sheets having a small thickness are difficult to manufacture.

According to the method of U.S. Pat. No. 3,098,831, polyolefin is mixed with organic peroxide and blowing agent, and the resulting mixture is heated at such a temperature that the organic peroxide is decomposed to effect crosslinking, while the blowing agent is not decomposed, and then the temperature is further raised so as to expand the polyolefin by gases generated by decomposition of the blowing agent. According to the method of U.S. Pat. No. 3,098,831, although foamed articles having high weather resistance and uniform fine cells can be obtained, it is necessary to effect cross-linking by decomposing only the organic peroxide without decomposing the blowing agent, so that the heating temperature should not be raised so high as to cause decomposition of the blowing agent, and, therefore, a long time is necessary for heating. Accordingly, foamed polyolefin sheet cannot be obtained continuously and efficiently.

As regards conventional methods of producing foamed sheets of thermoplastic resins other than polyolefin, a method of manufacturing polystyrene paper and another method of manufacturing foamed sheets of vinyl chloride have been known. Polystyrene paper has been manufactured by adding blowing agent to polystyrene and extruding the resulting mixture by an inflating device. Foamed sheets of polyolefin can be prepared by such method, but the minimum density of the foamed sheet obtained by the method is about 0.3 g/cc., and heat insulation and cushionability of the foamed sheets are poor. On the other hand, the other known method of manufacturing foamed sheets of polyvinyl chloride comprises steps of adding blowing agent, plasticizer, and the other additives to polyvinyl chloride powder for paste resin, stirring the resulting mixture by a mixer to obtain a uniform plastisol, which is poured on a conveyor belt under atmospheric pressure, passing the belt through a high frequency heating furnace, and heating the plastisol, whereby the foamed sheet is obtained. However, the aforesaid method of manufacturing foamed sheets of polyvinyl chloride cannot be applied to polyolefin, because the temperature of polyolefin is not increased by high-frequency heating.

Generally speaking, foamed articles of polymer can be prepared by adding a blowing agent of evaporating or decomposing type to such polymer and heating the resulting mixture to effect expansion. Such general method, however, cannot be applied to certain resins for certain purposes, especially to polyolefin. If a polyolefin composition containing a cross-linking agent and a blowing agent is shaped into a sheet and heated in a furnace to effect cross-linking and foaming without using any supporting device, such sheet of the polyolefin composition is melted, deformed, and broken by its own weight, so that foamed sheets cannot be obtained. Furthermore, if such a composition sheet is placed on a solid belt conveyor and introduced into a furnace for heat treating, there is a considerable difference in temperature between the lower surface of the sheet in contact with the conveyor and the upper surface thereof exposed to hot air or heat radiation, even when the sheet is supported on a metal conveyor having excellent heat conductivity. Accordingly, the upper and lower surfaces of the sheet are heated unevenly, and the cross-linking agent and the blowing agent are also decomposed unevenly, and the sheet sometimes sticks to the conveyor belt in the cross-linking and foaming process. Thus, it is impossible to obtain satisfactory foamed sheets of polyolefin continuously and efficiently according to such conventional method.

It seems possible to heat the sheet of polyolefin composition uniformly by supporting the sheet between a pair of endless metal conveyor belts, but the perfect contact between said sheet and metal belt is impossible because of the inevitable partial existence of air between them, and the portion which is heated first is expanded earlier than the remainder thereof, thus reducing the heat conduction of the adjacent portions, so that uniformly foamed sheets cannot be obtained by such heating.

The plastics other than polyolefin, such as polyvinyl chloride, polystyrene, polyacrylic acid, polyacrylic acid ester, and the like, and rubbers have the same drawbacks as described above.

As a result of years of studies to obviate such difficulties of conventional methods, the inventors have found a new efficient method of manufacturing, at a very low cost, flawless foamed sheets of polymer composition of low density having a uniform fine cellular structure, which comprises mixing homogeneously a cross-linking agent and a blowing agent with a polymer selected from the group consisting of polyolefin, rubber, and plastics other than polyolefin, such as polyvinyl chloride, polystyrene, polyacrylic acid, and the like, and mixtures thereof, shaping the resulting mixture into a sheet without decomposing the cross-linking agent and the blowing agent, and heating both sides of said sheet at substantially the same rate to cross-link and foam the sheet while supporting the sheet on an endless belt conveyor provided with a large number of fine holes, through which the sheet can be directly heated.

DETAILED DESCRIPTION OF INVENTION
MANUFACTURE OF FOAMED SHEETS

The second aspect of the present invention consists of a method of manufacturing the polymer foamed sheet, which comprises mixing the polymer with a cross-linking agent and a blowing agent, molding the resulting composition into a sheet without decomposing both the cross-linking agent and the blowing agent, mounting the sheet on an endless belt provided with a large number of fine holes through which the sheet can be directly heated, and heating both sides of said sheet at substantially the same rate to cross-link and foam the sheet.

An object of the second aspect of the present invention is to provide an efficient method of producing, at low cost, flawless foamed polymer sheets of low density having a fine closed cellular structure.

Another object of the second aspect of the present invention is to provide a method for continuous and speedy production of foamed polymer sheets having a large width, such as 2 m, and various thicknesses, such as 2 to 25 mm.

A further object of the second aspect of the present invention is to provide a method for production of foamed polymer sheets having an improved heating insulating property and satisfactory mechanical strength, which are suitable for heating insulating material, especially for low temperature application, and building material.

Another object of the second aspect is to provide a method of producing foamed polymer sheets having excellent cushionability, water proofness, chemical resistance, and weather resistance, which are particularly suitable for packing material.

When a sheet of such a polymer composition containing a cross-linking agent and a blowing agent is heated on a supporting means having a structure similar to metal screens, the sheet can be heated almost uniformly at both upper and lower surfaces thereof. If the heating is effected very slowly, the composition is melted at first and deformed. So, in this case, the foamed and expanded composition tends to stick to the metal screen-like supporting means. On the other hand, if the heating is effected quickly, then cross-linking occurs on the surface of the sheet prior to melting and deformation, due to the very low heat conductivity of the polymer composition, and the cross-linkage covers the surface of the sheet and serves to prevent the polymer composition from sticking. Furthermore, the cross-linkage covers the surface of the sheet, so that the sheet is maintained in the original shape, and the sheet is expanded uniformly in all three dimensional directions, and the sheet thus processed can be easily separated from the screen-like supporting means.

Therefore, the sheet supporting means usable in the method of the invention should necessarily be an endless belt conveyor having innumerable fine openings, as in metal screen, through which the sheet can be heated directly. With only such supporting means, the sheet can be heated substantially uniformly at both the upper and lower surfaces thereof for producing an excellent foamed sheet. A metal screen can be used as the supporting means, and the smaller the meshes of the screen, the lower the heat conduction, and as the meshes are larger, the trace of such screen pattern is more explicitly given on the foamed sheet. The commonly used mesh designation of the screen is in the range of 5 to 200 meshes (Tyler standard), preferably 20 to 100 meshes, and the wire diameter and mesh can be selected depending upon both the particular composition of the material and the heating conditions of the foaming process.

For the mode of heating, it is preferable that a desired number of slit nozzles having substantially the same length as the width of the sheet are arranged in parallel with one another at right angles to the longitudinal direction of the sheet, and that hot air is blown from the vertical direction to the sheet in such a manner that opposite cross air flow can be formed, because the heat can be conducted quickly and efficiently into the inner portion of the sheet, and also the sheet can be heated uniformly, while maintaining the temperature gradient in the sheet uniformly. The nozzles below the sheet are usually positioned closer to the sheet than those above the sheet to heat the upper and lower surfaces of the sheet uniformly. When a cross-linking agent having a lower decomposition temperature than that of the blowing agent is used, and, further, the aforesaid quick heating is carried out at a temperature higher than the decomposition temperature of the blowing agent, the cross-linking occurs, first on the surface of the sheet by decomposition of the cross-linking agent in the surface region, and second, the cross-linking agent and the blowing agent inside the sheet are decomposed simultaneously. In other words, the blowing agent is decomposed while cross-linking develops in the polymer composition by decomposition of the crosslinking agent. Thus, there is produced a foamed sheet having uniform fine cells and a density as low as 0.02 g/cc. With the aforesaid method of the invention, it is possible to produce continuously, at a low cost, a foamed sheet having a thickness as large as 2 to 25 mm and a width as large as 2 m.

It is preferable to form a cross-linked crust on the surface of the sheet prior to introduction of the sheet into the foaming furnace. In this case, it is possible to select the heating temperature, time, and means, and the like without regard to how and when the cross-linking and the foaming of the interior of the sheet is achieved. Therefore, the cross-linked crust of the surface is formed satisfactorily, so that when the thus treated sheet is foamed in the foaming furnace, being carried therethrough on a metal screen conveyor, the resulting foamed sheet exhibits no trace of the screen pattern of the conveyor. Moreover, in this case, a sheet having a very regular shape and a beautiful appearance can be formed. This is probably due to the fact that the heat deformation temperature of the previously formed cross-linked crust is high and, therefore, premature expansion during the foaming is suppressed.

The heating of the surface layer may be effected by infrared lamp, hot air, electric heating, etc., but in order to form the cross-linked crust on the surface layer only without deforming the sheet, it is necessary to heat said sheet at a temperature as high as possible for a time as short as possible and immediately cool. The heating is generally effected so as to raise the surface temperature to a temperature above the decomposition temperature of the cross-linking agent, preferably from about 100°C to about 300°C, and said heating is usually applied over the entire surface area, but in special cases, only a desired part of the surface area may be heated. The time required to effect the surface cross-linking will depend upon the polymer employed.

The skin layer of the foam obtained by this method is well cross-linked and very strong. Also, as the skin layer has been oxidized at a high temperature, the number of its polar groups is considerably increased. Therefore, the foam manifests remarkably superior properties regarding adhering by an adhesive or due to heat fusing, and, further, a clear printing can be easily made on the skin layer.

The temperature range and duration of the heating in the oven in the cross-linking and foaming process according to the invention are from about 100°C to about 300°C, preferably from about 140°C to about 230°C, and 2 to 10 minutes.

The foamed sheets obtained by the method of the present invention have a strong skin and improved heat insulation, cushionability, weather resistance, low brittleness temperature, chemical resistance, and low water absorption, as well as excellent mechanical properties. Accordingly, the foamed sheets made by the method of the invention can be used very widely as materials for building, packing, agriculture, floating, etc.

Figure 5:
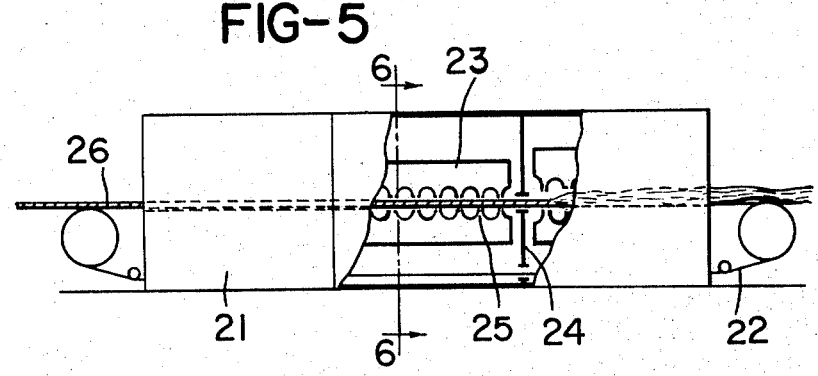
Figure 6:
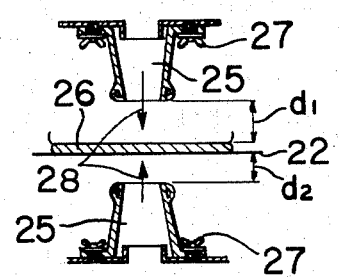
Figure 7:
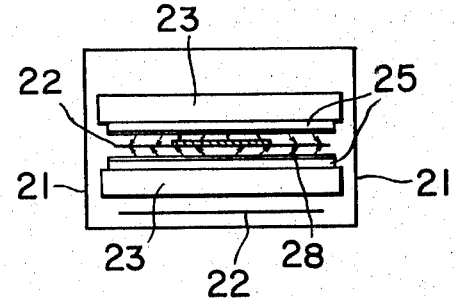

For a better understanding of the invention, reference is made to the following figures of the accompany drawing, in which:

FIG. 5 is a diagrammatic illustration of one embodiment of a heating device usable in the method according to the present invention, with certain parts thereof being broken away;

FIG. 6 is a schematic view illustrating a transverse section of slit nozzle portion in the device of FIG. 5; and FIG. 7 is a schematic sectional view taken along the line III—III of FIG. 5, illustrating the manner in which hot air is blown to a sheet of the polymer composition to be foamed.

Referring to FIG. 5 illustrating a heating device usable in carrying out the method of the present invention, an endless belt conveyor 22 has a great number of small holes and is adapted to allow hot air to pass therethrough to heat the sheets 26 directly and uniformly. The endless belt conveyor acts to convey the sheet 26 through a furnace enclosed by housing walls 21 and provided with hot air circulating ducts 23, partitions 24, and slit nozzles 25 for blowing air.

The endless belt conveyor 22 usable in the method of the invention has a great number of small holes, through which hot air can be delivered to the polymer composition sheet at a substantially uniform rate, and, for instance, the endless belt conveyor 22 is made of metal screens or a metal plate having innumerable fine holes bored therethrough. If a metal screen is used, it should be in the range of 5 to 200 meshes (Tyler standard), preferably 20 to 100 meshes, and, if a metal plate is used, fine holes should be bored therethrough to provide a similar ratio between the opening area and the metal supporting surface area to that of the aforesaid metal screen. If a metal screen of fine mesh consisting of thin wires is used, it is preferable to supplement its mechanical strength by supporting with another screen of rough mesh consisting of thick wires. The surface of the endless belt 22 should be as smooth as possible to insure uniform expansion of the polymer composition sheet thereon.

To facilitate separation of a foamed sheet from the endless belt conveyor 22 at the end of the heat treatment, it is preferable that each bored opening in the endless belt is tapered so that the cross-sectional area thereof increases gradually as the opening extends toward the upper surface of the belt. Namely, even when the lower surface of the sheet is melted and extended into such openings, the sheet can be easily separated from the belt conveyor by cross-linkage and expansion due to foaming. The material for the endless belt conveyor usable in the method of the invention is stainless steel, galvanized iron, aluminum, alloys such as brass, organic substance such as polyfluoroethylene fibers, or inorganic substance such as glass fibers.

It is also permissible to use silicone oils, a polyfluoroethylene emulsion, or powdered particles of mica or talc, in order to prevent adhesion of the polymer composition sheet to the endless belt conveyor.

The heating of the polymer sheet can be conducted by any suitable means, such as heat radiation from nichrome wires or infrared ray lamps, or natural or forced flow of hot air.

It is essential in the present invention that the heating is effected directly and rapidly to such a temperature that both the cross-linking agent and blowing agent are decomposed simultaneously, whereby cross-linkage is formed between individual polymer to form macromolecule, and, at the same time, the blowing agent is decomposed to expand the polymer sheet. The temperature in the heating furnace is from about 100°C to about 300°C, and preferably from about 140°C to about 230°C.

Alternatively, the heating can be preferably effected by means of the device as shown in the accompanying drawing, in which a forced air heating system is employed by means of slit nozzles as shown in FIG. 6. The hot air from the slit nozzles 25 is blown so as to form opposite cross air flow as shown in FIG. 7, so that both the upper and lower surfaces of the sheet are heated substantially uniformly at every portion, and the heat conduction to the sheet is made effectively, and, therefore, thick foamed polymer sheet, which has never been obtained by any other conventional process, can be obtained. In FIG. 6, the reference numeral 27 designates thumbscrews of fasten guide vanes of air streams, and arrows 28 in FIGS. 6 and 7 indicate the directions of hot air flow. The heating condition in this case is generally a hot air velocity of from about 5 to about 20 m/sec. and a hot air temperature of from about 140°C to about 230°C.

In order to effect substantially the same rate of feeding hot air both to the lower surface of the sheet, which is supported on the endless belt conveyor, and to the open upper surface thereof, it is preferable to provide a larger clearance $d_1$ (FIG. 6) between the upper nozzles and the sheet than the corresponding clearance $d_2$ (FIG. 6) between the lower nozzle and the sheet. At the same time, the air velocity at the lower nozzle can be set higher than at the upper nozzle, and, in this case, the foamed sheet can be easily separated from the endless belt conveyor. Furthermore, in order to heat the center and edge portions of the sheet uniformly, the width of each slit nozzle may preferably be made narrower in the center than at both end portions. The heating furnace according to the present invention can be divided into two or more zones, whereby the temperature and hot air blowing rate can be varied.

The foamed sheet delivered from the heating furnace is generally taken out while being cooled by calendar rolls, whereby the sheet surface is smoothed and the thickness thereof is made uniform.

The foamed sheet obtained by the method of the present invention can be subjected to any desired secondary process in the course of cooling, such as embossing by means of embossing rolls, lamination with plastic sheet or cloth by heating or adhesive, two-direction drawing, vacuum molding, and compression molding. Moreover, elongated foamed strings can be manufactured continuously by passing the foamed sheet between two rolls each provided with semicircular grooves on the surface.

The cross-linking of the surface layers of the sheet matrix is accomplished generally as described in the foregoing by irradiation with infrared lamps or applying a blast or hot air. In the operation of the process, the sheet matrix is extruded from an extruder under such conditions that there is no decomposition of either the cross-linking agent or the blowing agent, and the extruded sheet is cooled immediately upon leaving the extruder. The sheet is then carried through a series of rollers and brought to the heating furnace where it is carried through by the screen. Between the extruder and the heating furnace, the surface cross-linking is accomplished. In a preferred mode, infrared lamps are applied against one surface of the moving sheet, the sheet is then cooled, infrared lamps are applied to the other surface of the sheet, and the sheet is then cooled and finally presented to the screen to be transported through the heating furnace. As previously noted, hot air may be used in place of the infrared lamp, or, for that matter, any other heat source which will serve the purpose of raising the surface regions of the sheet above the decomposition temperature of the cross-linking agent incorporated therein.

MATERIALS

The various polymers to which this invention applies include homopolymers of olefins, olefin ionomers, styrene, and vinyl chloride; copolymers and terpolymers containing any of the foregoing monomers as one or more of the constituents; elastomeric polymers including, without limitation, natural rubber; and mixtures or alloys of any of the foregoing with each other or with other materials.

The polyolefins to be used in the present invention are crystalline and include polyethylene made by high, medium, or low pressure polymerization process, polypropylene, polybutene-1, ethylene-propylene copolymer, ethylene-butene copolymer, propylene-butene copolymer, ethylene-styrene copolymer, ethylene-vinyl acetate copolymer, ethylene-acrylic acid copolymer, ethylene-acrylic acid ester copolymer, ethylene-acrylic acid salt copolymer, chlorinated polyolefin polymer or mixture of two or more of these polymers.

The plastic, other than polyolefin, to be used in the present invention is selected from the group consisting of polyvinyl chloride, polystyrene, polyacrylic acid, polyacrylic acid ester, and their copolymer, terpolymer, and chlorinated polymer.

The rubber to be used in the present invention is selected from the group consisting of natural rubber, ethylene-propylene rubber, butyl rubber, polyisobutylene, polybutadiene, polyisoprene, styrene-butadiene rubber, sulphochlorinated polyethylene, and polychloroprene.

These substances can be mixed suitably depending upon the use and used in order to improve elasticity, strength, hardness, flexibility, adhesiveness, printability, and burning resistance of foam product.

As the cross-linking agent to be used in the present invention, use may be made of organic peroxides, azido compounds, p-quinone-dioximes, sulfur, organic accelerator and metal oxide, which can form cross-linkage in the high polymer. The organic peroxide cross-linking agents are mainly used for polyethylene or polyethylene copolymers, and these are dicumyl peroxide, 2,5-dimethyl-2,5-di(tert-butylperoxy) hexane, 2,5-dimethyl-2,5-di(tertbutylperoxy) hexyne, 1,3-bis(tert-butylperoxyisopropyl) benzene, di-tert-butylperterephthalate, tert-butylhydroperoxide, di-tert-butylperoxide, etc. The azido cross-linking agents are mainly used for polypropylene, polybutene-1, and the copolymers thereof, and these are various polysulfonazides, azidoformates, aromatic polyazides, for example, 1,7-heptane-bis-sulfonazide, 1,9-nonane-bis-sulfonazide, 4,4'-diphenylmethane-bis-sulfonazide, polyethylene-sulfonazide, n-octadecyl-azidoformate, phenyl-azidoformate, 2,2'-oxyethylene-bis-azidoformate, 4,4'-diphenyl-diazide, m-phenylene-diazide, etc.

The most suitable kind and the amount of the cross-linking agent to be added vary, depending upon the selection of the polymer and the mixture ratio, if any, and must be selected suitably in each case.

The blowing agents to be used in the present invention should be decomposable at a higher temperature than the softening temperature of the polymer. Said agents include, for example, azodicarbonamide, di-nitroso-pentamethylene-tetramine, p,p'-oxy-bis-benzene-sulfonyl-hydrazide, p-toluene-sulfonyl-semicarbazide, etc. However, it is preferable that the blowing agents have a higher decomposition temperature than that of the cross-linking agents.

Moreover, if necessary, a foaming assistant, such as zinc white or stearic acid salt, can be used.

In addition, fillers, such as chopped glass fiber, carbon black, calcium carbonate, silicate, and titanium white, can be added in an amount of less than 150 parts by weight per 100 parts by weight of the polymer.

Furthermore, pigments, softening agents, lubricants, anti-oxidants, and anti-statics can also be added.

According to the present invention, it is necessary to mold, for example, to extrude, the matrix or sheet without decomposing the blowing agent and the cross-linking agent, and, in order to promote this moldability, a low molecular weight organic compound, such as stearic acid, its salts, paraffin-wax, kerosene, and liquid polybutene, may be added in an amount of less than 10 parts by weight per 100 parts by weight of the polymer.

Furthermore, flame-retarting agents, such as chlorinated paraffin and antimony trioxide, or mixture thereof, can be added to the composition in an amount of 20 to 70 parts by weight per 100 parts by weight of the polymer.

The invention will be further explained in detail by examples. In the following examples percent and part mean by weight.

Example 1

To 100 parts by weight of polyethylene, Trade Name DND 2450 (melt index : 1 to 1.5 Nitto-Unica make) manufactured by a high pressure process were added 1.0 part by weight of dicumyl peroxide and 10 parts by weight of azodicarbamide at about 100°C for roll temperature and homogenized to uniformly disperse, then shaped into a slab of 200 × 200 × 15 mm by means of a press (The density of the slab was 0.96 g/cc.). And the slab was succeedingly heated at 190°C for 10 minutes under a pressure of 140 Kg/cm² in a piston type mold whose inner volume is changeable by increasing the inner pressure to cause cross-linking by organic peroxide and decomposition of the blowing agent and to effect a partial expansion, and then cooled to room temperature while additional volumetric expansion was being avoided. The slab thus obtained was 0.62 g/cc. in density, namely expanded 1.55 times the original volume. This partially expanded slab was left at room temperature for 120 hours and then put into an autoclave and heated for about 35 minutes under the steam pressure of 1 Kg/cm$^2$ (at about 120°C) to expand, and a foamed slab was manufactured. The foamed slab had the same shape as before expansion and its surface was smooth having the size of about 500 × 500 × 37 mm. The density of the foamed slab was 0.048 g/cc. and foaming efficiency was about 80 percent and it consisted of uniform fine independent cells each having average diameter of 25 microns which is considerably smaller than that of the cell in the polyethylene foamed body on the market, which is about 500 microns. Moreover, no cavity is found in the interior of the foamed slab. The "foaming efficiency" means the ratio of theoretical quantity of gas generated from the blowing agent and the volume of gas occluded in the foamed body.

Example 2

To 100 parts by weight of polyethylene, Trade Name Staflene E—650 (melt index : 6.5, Furukawa Kagaku make) manufactured by medium pressure process were added 10 parts by weight of azodicarbonamide and 3 parts by weight of 2,5-dimethyl-2,5-di(tertiary-butyl peroxy) hexane were mixed at about 135°C of roll temperature and homogenized to uniformly disperse, then the composition was shaped into an article (0.99 g/cc. in density), and heated in the same mold as in Example 1 under a pressure of 100 Kg/cm$^2$ at 190°C for 10 minutes by a press to perfectly decompose the organic peroxide and blowing agent and to effect a partial expansion, and then cooled to room temperature while said pressure was being kept to limit the additional expansion. The partially expanded slab had a density of 0.56 g/cc. Thereafter the shaped article was put in an autoclave to be heated for 15 minutes under the steam pressure of 4 Kg/cm$^2$ (about 150°C), and the pressure was reduced to cause further expansion. The shaped article of foamed body thus obtained had uniform fine cell structure with density of 0.061 g/cc. and foaming efficiency of about 65 percent and had excellent mechanical strength.

Example 3

To 100 parts by weight of ethylene-propylene copolymer, Trade Name Staflene E—530 (melt index : 3.5 Furukawa Kagaku make) manufactured by a medium pressure process were added 5 parts by weight of azodicarbamide and 3 parts by weight of 2,5-dimethyl-2,5-di(tertiary-butyl peroxy) hexane at about 135°C of roll temperature and homogenized to uniformly disperse, then shaped into a slab by a press (0.97 g/cc. in density). The slab was heated at 180°C for 20 minutes in the same mold as in Example 1 by applying a pressure of 100 Kg/cm$^2$ to completely decompose the organic peroxide and the blowing agent and to effect a partial expansion, then cooled down to room temperature while said pressure was being kept to limit the additional volumetric expansion. The partially expanded slab had a density of 0.60 g/cc. Thereafter the slab was put into an autoclave and heated for 15 minutes under steam pressure of 4 Kg/cm$^2$ and the pressure was reduced to cause further expansion. The foamed slab thus obtained had uniform fine cell structure with density of 0.11 g/cc. and foaming efficiency of about 65 percent and had excellent mechanical strength.

Example 4

Fifty parts by weight of polyethylene (Staflene E—650) manufactured by a medium pressure process and 50 parts by weight of polyethylene (DND 2450) manufactured by a high pressure process were mixed by means of rolls at a temperature of about 135°C. To this mixture were admixed 25 parts by weight of azodicarbonamide and 1 part by weight of dicumyl peroxide and homogenized to disperse uniformly. Then the mixture was made into slab by means of a press (1.09 g/cc. in density). The slab thus obtained was heated at 190°C for 10 minutes in the same mold as in Example 1 under a pressure of 150 Kg/cm$^2$, thereby decomposing organic peroxide and blowing agent and effecting a partial expansion, and then cooled down to room temperature while said pressure was being kept to limit the additional volumetric expansion. The slab thus obtained (0.59 g/cc. in density) was introduced into flat metal mold, in which the slab can further expand, and placed in an autoclave to be heated under steam pressure of 5 Kg/cm$^2$ (about 158°C) for 10 minutes, and then the pressure was reduced to cause further expansion. The foamed slab showed considerably good molding characteristics and uniform fine cell structure with the density of 0.024 g/cc., the foaming efficiency of about 72 percent, and very large specific volume.

Example 5

Polyethylene (DND 2450) manufactured by a high pressure process, Staflene E—650 manufactured by a medium pressure process, and ethylene-propylene copolymer, Staflene E—530 manufactured by a medium pressure process were admixed with rubber and plastic, blowing agent, and organic peroxide by means of a roll at the mixing ratio as shown in Table 1, and homogenized to uniformly disperse. The composition was shaped into a slab by a press, and heated in the same mold as in Example 1 at 190°C for 10 minutes by applying pressure of 150 Kg/cm$^2$, thereby perfectly decomposing the organic peroxide and the blowing agent and effecting a partial expansion, and then cooled down to room temperature while said pressure was being kept to limit its additional volumetric expansion. Then the partially expanded slab was placed in an autoclave and heated for 10 minutes under steam pressure of 5 Kg/cm$^2$ (about 158°C) and the pressure was reduced to cause further expansion. The foamed slab thus obtained had uniform fine cell structure and additional excellent characteristics of the rubber of plastic added. The density and foaming efficiency of the foaming slab are shown in Table 1.

Table 1

| Material and properties | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Polyethylene by high pressure process (DND 2450) | 80 | 80 | 80 | 80 | | | | | | | 80 | 80 | 80 | 80 |
| Polyethylene by medium pressure process (Staflene E-650) | | | | | 80 | | 80 | 80 | 80 | 80 | | | | |
| Ethylene-propylene copolymer (Staflene E-530) | | | | | | 80 | | | | | | | | |
| ABS resin | 20 | | | | | | | | | | | | | |
| Natural rubber | | 20 | | | | | | | | | | | | |
| Styrene-butadiene rubber | | | 20 | | | | | | | | | | | |
| Butyl rubber | | | | 20 | | | | | | | | | | |
| Polyisobutylene | | | | | 20 | | | | | | | | | |
| Ethylene-propylene rubber | | | | | | 20 | | | | | | | | |
| Polystyrene | | | | | | | 20 | | | | | | | |
| Chlorosulfonated polyethylene | | | | | | | | 20 | | | | | | |
| Chlorinated polyethylene | | | | | | | | | 20 | 20 | | | | |
| Polypropylene | | | | | | | | | | | 20 | | | |
| Ethylene-vinyl acetate copolymer | | | | | | | | | | | | 20 | | |
| Azodicarbamide | 10 | 10 | 10 | 10 | 10 | 10 | 10 | 10 | 10 | 10 | 10 | 10 | 10 | 10 |
| Dicumyl peroxide | 0.5 | 0.5 | 0.5 | 0.5 | | | | | | 0.5 | 0.5 | 0.5 | 0.5 | 0.5 |
| 2,5-dimethyl-2,5-di(tertiary-butyl peroxy) hexane | | | | | 3 | 3 | 3 | 3 | 3 | | | | | |
| Density (g/cc.) | 0.046 | 0.049 | 0.071 | 0.044 | 0.053 | 0.051 | 0.057 | 0.057 | 0.058 | 0.045 | 0.054 | 0.050 | 0.052 | 0.049 |
| Foaming efficiency (%) | 85 | 78 | 52 | 87 | 73 | 76 | 68 | 72 | 67 | 85 | 71 | 77 | 74 | 78 |

Remarks

| | |
|---|---|
| ABS resin | Abson 810 × 102 (Goodrich make) |
| SBR | Ameripole 1500 (Nippon Zeon make) |
| Butyl rubber | Polisar B 100 (Polymer Corporation make) |
| Polyisobutylene | Opanol B-100 (BASF make) |
| EPR | Dutral N (Montecatini make) |
| Polystyrene | Stylon 666 (Asahi Dow make) |
| Chlorosulfonated polyethylene | Hypalon 20 (Du Pont make) |
| Chlorinated polyethylene | Rulan 2NC10 (Du Pont make) |
| Polypropylene | Avisun 1044 (Avisun make) |
| Ethylene-vinyl acetate copolymer | Elvax 250 (Du Pont make) |

Example 6

To 100 parts by weight of polyethylene (DND 2450) manufactured by a high pressure process were added 0.3 part by weight of dicumyl peroxide and 5 parts by weight of dinitroso pentamethylene tetramine at a roll temperature of 100°C and homogenized to uniformly disperse. The composition was shaped into a slab (0.95 g/cc. in density) and heated by means of a press using the same mold as in Example 1 at 190°C for 15 minutes by applying a pressure of about 150 Kg/cm² to perfectly decompose the organic peroxide and the blowing agent and to effect a partial expansion. Then the slab was cooled down to room temperature, while said pressure was being kept to limit its additional volumetric expansion. The partially expanded slab had a density of 0.61 g/cc. and was heated in air oven at 180°C for 10 minutes to expand and the foamed slab thus obtained had uniform fine cell structure and a density of 0.12 g/cc. and foaming efficiency of about 58 percent.

Example 7

To 70 parts by weight of polyethylene (DND 2450) manufactured by a high pressure process were added 30 parts by weight of polystyrene (Stylon 666) by means of a roll at a temperature of about 150°C and homogenized and to the mixture were added 15 parts by weight of azodicarbamide and 0.5 part by weight of dicumyl peroxide at about 135°C and uniformly dispersed. The composition thus obtained was shaped into a slab by means of a press at 135°C (1.00 g/cc. in density) and then placed in an autoclave to be heated at 200°C for 30 minutes in nitrogen of 50 atmospheric pressures to perfectly decompose the organic peroxide and the blowing agent and to effect a partial expansion. Then, after it was cooled down to room temperature and the pressure was taken away. The product taken out showed a little expansion of volume (0.54 g/cc. in density). After it was left for 24 hours the shaped article weighing 6 g was transferred into an autoclave having inner capacity of 200 cc. and was heated at 150°C in nitrogen of 5 atmospheric pressures in order to prevent escape of gas formed by decomposition of the blowing agent. After 20 minutes the pressure was exhausted and the product was expanded in the autoclave under reduced pressure of about 400 mmHg, then after cooled it was taken out. The foamed body thus obtained had uniform fine cell structure without internal cavity and had a very large rigidity and a density of 0.045 g/cc. and foaming efficiency of about 72 percent.

Example 8

To 100 parts by weight of polyethylene (DND 2450) manufactured by a high pressure process were added 1.0 part by weight of dicumyl peroxide and 30 parts by weight of azodicarbamide by means of a roll at a temperature of about 100°C and homogenized to disperse uniformly. Then the composition was shaped into slab (1.05 g/cc. in density) and introduced into an autoclave to be heated, in nitrogen of 70 atmospheric pressures, at 160°C for 15 minutes to decompose the organic peroxide and then at 200°C for 60 minutes to decompose the blowing agent completely and to effect a partial expansion, then cooled down to room temperature under pressure (0.44 g/cc. in density). The treated product was heated at 120°C for 20 minutes in the autoclave under nitrogen stream of 2 Kg/cm² to expand, and then cooled down to room temperature under pressure. The foamed body thus obtained had uniform fine cell structure, density of 0.023 g/cc., foaming efficiency of about 68 percent, a very high specific volume, excellent low heat transmission and softness to the touch.

Example 9

To 80 parts by weight of polyethylene (DND 2450) manufactured by a high pressure process were added 20 parts by weight of polyethylene DYLT (melt index : 200, Union Carbide Co. make) manufactured by a high pressure process by means of a roll at a temperature of about 90°C and homogenized uniformly. The mixture was mixed with 10 parts by weight of sodium bicarbonate, 5 parts by weight of azodicarbamide and 0.5 part by weight of dicumyl peroxide and homogenized to disperse uniformly, then the composition was shaped into a slab by means of a press (1.03 g/cc. in density). The slab was heated in the same mold as in Example 1 at 190°C for 10 minutes under a pressure of 100 Kg/cm² to decompose the organic peroxide and the blowing agent and to effect a partial expansion and then cooled down to room temperature while said pressure was being kept to limit additional volumetric expansion. The products thus obtained was 0.63 g/cc. in density and was heated in an autoclave under gaseous carbon dioxide of 5 Kg/cm² at 110°C for 30 minutes and the pressure was reduced to cause further expansion.

The foamed body thus obtained had uniform, fine cell structure, density of 0.06 g/cc. and foaming efficiency of about 75 percent.

Example 10

Seventy parts by weight of polyethylene (DND 2450) manufactured by a high pressure process, 15 parts by weight of chlorinated paraffin containing 70 percent of chlorine, 15 parts by weight of antimony trioxide, 10 parts by weight of azodicarbonamide, 1 part by weight of dicumyl peroxide and 1 part by weight of cadmium stearate were mixed and homogenized uniformly, and then the mixture was shaped into a slab of 10 × 50 × 50 mm by means of a press (1.45 g/cc. in density). The slab thus obtained was heated in an autoclave under nitrogen pressure of 10 Kg/cm² at 200°C for 30 minutes to decompose the blowing agent and the organic peroxide to effect a partial expansion and then cooled down to room temperature while said pressure was being kept to limit additional volumetric expansion.

The product thus obtained (0.27 g/cc. in density) was heated in an oven at 130°C for 30 minutes to expand.

The foamed body thus obtained had density of 0.056 g/cc., foaming efficiency of 75 percent and excellent self-extinguishing property.

Examples 11 to 13

A composition consisting of 100 parts by weight of high pressure process polyethylene having a melt-index of 1 (manufactured by Nitto Yunika K. K., DND 2450), 15 parts by weight of azodicarbonamide and 1 part by weight of dicumyl peroxide was subjected to extrusion molding through T-die of an extruder of 115 mm, in which cylinder temperature and head temperature were adjusted at 130°C and 110°C respectively, into a matrix $M_1$ (0.98 g/cc. in density) having a thickness of 18 mm and a width of 350 mm. Then $M_1$ was cut into a length of 350 mm ($M_2$). $M_2$ was placed in a mold having substantially similar shape to $M_2$, which was put between a hot press and heated at a temperature of 160°C under a surface pressure of 50 Kg/cm² for 30 minutes to decompose the cross-linking agent and form cross-linkages and then the cross-linked matrix was cooled and taken out ($M_3$). $M_3$ (0.98 g/cc. in density) was mounted on a multistage heating frame and placed in the pressure vessel, into which nitrogen was introduced to purge air in it and raise the nitrogen pressure to 10 Kg/cm². The cross-linked matrix was heated to 200°C, and said heating was continued for 80 minutes under the avove mentioned pressure to decompose the blowing agent and to effect a partial expansion. After the heating was completed, compressed water was introduced into the pressure vessel by a turbine pump and simultaneously nitrogen was exhausted gradually and replaced with the water while maintaining the above mentioned pressure in the pressure vessel, whereby the partially expanded body was cooled.

After the cooling, water was removed, and the partially expanded body ($M_4$), which expanded to about 5 times and had a similar shape to $M_3$ was taken out.

The $M_4$ (0.20 g/cc. in density) was placed in a steam pressure vessel and heated at a temperature of 140°C (about 4 Kg/cm²) for 15 minutes. And the pressure was reduced to cause further expansion. $M_4$ was expanded to about 50 × 1,000 × 1,000 mm ($M_5$). $M_5$ had a smooth surface and a substantially similar shape to $M_3$. Average diameter of cells and density of the foam are shown in Table 2. Examples 12 and 13 in Table 2 were conducted in the same manner as described in Example 11 except changing the nitrogen pressure at the partial expansion.

Table 2

|  | Example 11 | Example 12 | Example 13 |
| --- | --- | --- | --- |
| Nitrogen pressure at the partial expansion (Kg/cm²) | 10 | 5 | 20 |
| Dimension of foam (mm) | 1,000 × 1,000 × 50 | 970 × 970 × 48 | 1,020 × 1,020 × 50 |
| Appearance of foam | Smooth and fine | Smooth and fine | Smooth and fine |
| Average diameter of cells ($\mu$) | 60 | 100 | 40 |
| Density of foam (g/cc.) | 0.034 | 0.035 | 0.033 |

Comparative Examples 1 and 2

In order to compare the present invention with prior art, $M_2$ and $M_3$ were placed in an air oven and heated at 200°C for 45 minutes to obtain foams. Both of them had very uneven surfaces and were considerably deformed by strain, and the shapes were different from those of their matrices. There were large voids in the interior of the foams and the cells were coarse and uneven. Cracks were partially foamed in the surface. The densities of the foams were 0.097 g/cc. and 0.072 g/cc. respectively and the average diameters of cells were about 2 mm and about 500 $\mu$ respectively. From the comparison it is apparent that the present invention is excellent.

Example 14

Pellets of composition consisting of 50 parts by weight of high pressure process polyethylene (manufactured by Nitto Yunika K. K., DND 2450) having a melt index of 1, 50 parts by weight of medium pressure process polyethylene (Staflene E—650, manufactured by Furukawa Kagaku K. K.) having a melt index of 5, 15 parts by weight of azodicarbonamide, 2.5 parts by weight of 2,5-dimethyl-2,5-di(tert-butylperoxy) hexane and 4 parts by weight of purified kerosene were extruded through an extruder of 115 mm, the cylinder and the head of which had been controlled at temperatures of 135°C and 115°C respectively, into a matrix having substantially the same dimension as that in Example 11. The matrix (1.01 g/cc. in density) was subjected to cross-linking, partially expansion (0.21 g/cc. in density), cooling and secondary expansion under the same conditions as in Example 11 to obtain a considerably hard foam $M_5$ having a similar shape to the matrix. $M_5$ had a smooth surface and was composed of fine and uniform independent cells, the average diameter of which was about 90 $\mu$ and had a density of 0.037 g/cc. The compression deflection load at 25 percent compression was 0.7 Kg/cm$^2$, which was considerably harder than the foam composed of only high pressure process polyethylene.

Example 15

A composition consisting of 80 parts by weight of high pressure process polyethylene (manufactured by Nitto Yunika K. K., DND 2450) having a melt index of 1, 20 parts by weight of ethylene-propylene copolymer (manufactured by Furukawa Kagaku K. K., E—530) having a melt index of 3.5, 15 parts by weight of azodicarbonamide, 0.8 part by weight of dicumylperoxide and 3 parts by weight of purified kerosene was treated under the same conditions as described in Example 14 to obtain a foam. The obtained foam had a smooth surface and a similar shape to the matrix and was composed of fine and uniform independent cells, the average diameter of which was about 80 $\mu$, and had a density of 0.035 g/cc. and an excellent mechanical strength.

Example 16

A composition consisting of 70 parts by weight of high pressure process polyethylene used in Example 11, 30 parts by weight of butyl rubber (Polysar B—140, manufactured by Polymer Corp.) having a Mooney viscosity of 45, 15 parts by weight of azodicarbonamide and 1 part by weight of dicumyl peroxide was treated in the same manner as described in Example 11 in each step to produce a foam. The obtained foam was flexible and elastic, and had a resiliency of 60 percent. It had a smooth surface and was composed of independent cells, the average diameter of which was about 100 $\mu$, and had a density of 0.034 g/cc.

Example 17

A foam was produced in the same manner as described in Example 11 by using a composition consisting of 80 parts by weight of the same high pressure process polyethylene as used in Example 11 and 20 parts by weight of ethylene-acrylic acid ester copolymer (Zetafin 30, manufactured by Dow Chemical Co.) instead of the high pressure process polyethylene used in Example 11. The obtained foam was excellent in adhesiveness and printability, and composed of fine and uniform independent cells, the average diameter of which was about 80 $\mu$, and had a density of 0.035 g/cc.

Example 18

A foam was produced under the same conditions as described in Example 11 by using a composition consisting of 80 parts by weight of the same high pressure process polyethylene as used in Example 11 and 20 parts by weight of ethylene-metal salt of acrylic acid copolymer (Surlyn A, manufactured by E. I. DuPont de Nemours & Co., Inc.) instead of the high pressure process polyethylene used in Example 11. The obtained foam had high tenacity and elasticity, a smooth surface and a similar shape to the matrix and was composed of fine and uniform independent cells, the average diameter of which was 80 $\mu$, and had a density of 0.037 g/cc.

Example 19

The composition described in Example 11 was treated in the same manner as described in Example 11 to produce a matrix $M_2$, which was directly placed in a pressure vessel, without cross-linking by a hot press, and heated at a temperature of 150°C under nitrogen pressure of 10 Kg/cm$^2$ for 30 minutes to decompose only the organic peroxide, whereby cross-linking was effected. Further, the cross-linked matrix was heated at 190°C for 60 minutes under the same pressure to decompose the blowing agent, whereby the partial expansion was effected. Thereafter, cooling and secondary expansion were effected in the same manner as described in Example 11 to obtain a foam having a slight unevenness on the surface. The foam was composed of fine and uniform independent cells, the average diameter of which was about 70 $\mu$. The density was 0.034 g/cc. Sliced samples of the foam were not substantially varied after exposure in open-air for 2 years.

Furthermore, when the upper and lower surfaces of the matrix $M_2$ were cross-linked by irradiating the surface with infrared ray and then the resulting matrix was treated in the same manner as described above, the surface state of the foam was remarkably improved.

Example 20

The partially expanded body $M_4$ obtained in Example 11, was left to stand indoor for one week at room temperature, then it was heated under the same condition as described in Example 11 to produce a foam. The resulting foam was substantially the same as the foam obtained in Example 11 which expanded just after the decomposition of the blowing agent. The dimension was 950 × 950 × 48 mm, the diameter of the cells was about 60 μ and the density was 0.038 g/cc. These facts show that the partially expanded body can be stored for a relatively long period of time and can be transported.

Example 21

A composition consisting of 100 parts by weight of high pressure process polyethylene having a melt index of 1, 30 parts by weight of azodicarbonamide and 0.6 part by weight of dicumyl peroxide was extruded and molded under the same condition as described in Example 11 into a thick board having a thickness of 15 mm and a width of 280 mm, which was then cut into a length of 280 mm to obtain a matrix. Then the matrix (1.05 g/cc. in density) was treated with a mold having the same dimension as the above obtained matrix in the same manner as described in Example 11 to obtain a cross-linked matrix $M_3$. $M_3$ (1.05 g/cc. in density) was placed in a pressure vessel and treated in the same manner as described in Example 11 to obtain $M_4$, except that the nitrogen pressure was 15 Kg/cm². The dimension of $M_4$ was 25 × 520 × 520 mm (0.18 g/cc. in density). Then $M_4$ was heated at 140°C for 20 minutes in an air oven to obtain a foam having a dimension of 49 × 1,020 × 1,020 mm and a smooth surface. This foam was flexible and had an excellent touch, a high resiliency, an excellent cushionability and independent cells, the average diameter of which was about 100 μ. The density was 0.016 g/cc.

Comparative Example 3

In order to compare the present invention with a conventional method, the above $M_3$ was cut into a plate of 200 × 200 mm, which was then placed in a mold having the same dimension as said plate. The mold was put between a hot press and heated to 190°C while being pressed at a surface pressure of 50 Kg/cm². As the blowing agent was decomposed, causing a considerable rise in the inner pressure in the mold, a certain portion of the melted composition was ejected from the mold. It was difficult to prevent such an ejection completely by raising surface pressure or using any packing. After the mold was cooled for 20 minutes, decomposed composition remaining in the mold was taken out. When this was treated in an air oven at 140°C for 20 minutes, a considerably deformed foam having a different shape from that of the original plate was obtained. Moreover, it was found that the composition of 55 percent based on the total weight was lost by the ejection. The cells of the resulting foam were partially coarse and uneven. The density was 0.031 g/cc.

From this, it is apparent that the present invention is particularly superior to the conventional method in view of production of a foam having a low density.

Example 22

A composition consisting of 100 parts by weight of high pressure process polyethylene, 20 parts by weight of p,p'-oxy-bis-benzene-sulfonylhydrazide, 1 part by weight of dicumyl peroxide was molded by means of a press into a board of 250 × 250 × 10 mm, which was mounted on a multistage heating frame and placed in a pressure vessel. Nitrogen was introduced into the pressure vessel to raise the pressure in it to 10 Kg/cm². Then the matrix was heated at 190°C for 50 minutes to decompose the organic peroxide and the blowing agent to effect a partial expansion, and the partially expanded body was cooled with water under pressure by the conventional method. The partially expanded body was heated in an air oven at 140°C for 15 minutes to obtain a foam having a density of 0.065 g/cc. The average diameter of cells was 140 μ.

Example 23

A composition consisting of 70 parts by weight of high pressure process polyethylene, 15 parts by weight of chlorinated paraffin (chlorine content: 70 percent), 15 parts by weight of antimony trioxide, 10 parts by weight of azodicarbonamide, 1 part by weight of dicumyl peroxide and 2 parts by weight of basic magnesium carbonate was molded and foamed in entirely the same manner as described in Example 22. The resulting foam had a density of 0.05 g/cc. and was flame-retardant and had improved flexibility and adhesiveness.

Example 24

A composition consisting of 100 parts by weight of high pressure process polyethylene, 100 parts by weight of Thermax (Trade Name, carbon black, made by R. T. Vanderbilt Co.), 15 parts by weight of azodicarbonamide and 1 part by weight of dicumyl peroxide was subjected to a press molding at 130°C, and subsequently heated at 150°C for 30 minutes to decompose the organic peroxide, whereby cross-linkage was formed. After the cross-linked matrix was heated at 200°C for 60 minutes under a nitrogen pressure of 50 atm., the heating was stopped. Then, the resulting partially expanded body was cooled to room temperature while maintaining this pressure. The thus cooled body was again heated at 130°C for 30 minutes in an air oven. The resulting foam had a density of 0.12 g/cc., a considerably strong skin, a tensile strength of 0.28 Kg/mm², an elongation of 50 percent and an excellent mechanical strength.

Example 25

A composition consisting of 100 parts by weight of high pressure process polyethylene, 6 parts by weight of azodicarbonamide and 1 part by weight of dicumyl peroxide was subjected to a press molding at 130°C, and subsequently heated at 150°C for 30 minutes to decompose the organic peroxide, whereby cross-linkage was formed. The cross-linked matrix was placed in a pressure-proof vessel and heated for 1 hour while applying pressure by steam of 15 Kg/cm² to decompose the blowing agent, whereby partial expansion was effected. Then, the resulting partially expanded body was cooled down to room temperature while maintaining this pressure by introducing nitrogen gas. Subsequently, the partially expanded body was heated for 60 minutes under a steam pressure of 3.5 Kg/cm² (138°C), and then the pressure was reduced to atmospheric pressure to effect secondary expansion. The resulting foam had a density of 0.10 g/cc., a compression deflection load at 25 percent compression of 1.9 Kg/cm², and a high strength.

Comparative Example 4

For comparison, the composition expanded partially in the same manner as described in Example 25 was expanded by releasing the pressure immediately after effecting the partial expansion without cooling. The foam thus obtained had a considerably different shape from the matrix. Cracks were formed on the surface and the density was 0.33 g/cc.

Example 26

M₄ described in Example 11 was placed in an iron vessel of 45 × 900 × 900 mm provided with fine holes, and the vessel was placed in a steam pressure vessel, and heated at 140°C (about 3.7 Kg/cm²) for 25 minutes, and the pressure was reduced to cause further expansion.

In this manner, a foam having entirely the same shape as the inner volume of the vessel was obtained, and this foam had a density of 0.040 g/cc. The skin had no crease and there were projected parts corresponding to the above mentioned fine holes, and the resulting foam was extremely beautiful.

Examples 27 to 30

Compositions consisting of 100 parts by weight of high pressure process polyethylene, 1 part by weight of dicumyl peroxide, and 5, 15, 25 and 35 parts by weight of azodicarbonamide respectively were milled uniformly and molded with a press at 130°C. Then the matrices were heated at 160°C for 30 minutes to decompose the organic peroxide, whereby cross-linkage was formed. The cross-linked matrices were heated at 200°C for 90 minutes in pressure-proof vessels under nitrogen pressure of 20 Kg/cm² to decompose the blowing agents, whereby the partial expansion was effected, after which the partially expanded bodies were cooled to room temperature while maintaining the above mentioned pressure with compressed water. Then the cooled bodies were expanded secondarily in a hot air oven at 140°C to obtain foams having uniform and fine cells, the properties of which are shown in Table 3.

The comparative examples 5 and 6 in Table 3, had the same compositions as described in Examples 27 and 28 respectively, which were merely heated to generate foams under normal pressure. The resulting foams were lower in strength and more coarse in cell size than those of the present invention and moreover foams having a high thickness could not be obtained.

Example 31

Composition pellets consisting of 100 parts by weight of high pressure process polyethylene, 5 parts by weight of azodicarbonamide, 1 part by weight of dicumyl peroxide and 1 part by weight of phthalocyanine blue, and another composition pellets consisting of 100 parts by weight of high pressure process polyethylene, 10 parts by weight of azodicarbonamide and 1 part by weight of dicumyl peroxide were mixed in a mixture ratio of 1:1, and the mixed pellets were molded at 130°C by a press and subsequently, the molded matrix was heated at 160°C for 20 minutes to form cross-linkage. The cross-linked matrix was treated in the same manner as described in Example 27 to form a considerably beautiful foam, which had a density of 0.072 g/cc., and two colored uneven surface of stone wall pattern.

Example 32

A composition consisting of 100 parts by weight of stereospecific polypropylene having a melt index of 3 (Sumitomo Norbren, manufactured by Sumitomo Kagaku K. K.), 10 parts by weight of azodicarbonamide, 0.5 part by weight of 1,10-decane bissulfonamide and 5 parts by weight of purified kerosene was molded at a material temperature of 155°C into a board having a thickness of 18 mm and a width of 300 mm by means of an extruder provided with a T-die, which was cut into a length of 300 mm. The resulting matrix was placed in a pressure vessel and heated to 230°C for 60 minutes under a nitrogen pressure of 30 Kg/cm² to effect partial expansion. While maintaining this pressure, the partially expanded body was cooled to room temperature, and then heated to 170°C to effect secondary expansion under atmospheric pressure. The obtained foam had a density of 0.070 g/cc., a tensile strength of 15 Kg/cm² and an elongation of 30 percent.

Example 33

A composition consisting of 80 parts by weight of stereospecific polypropylene having a melt index of 3, 20 parts by weight of polyisobutylene, 5 parts by weight of azodicarbonamide, 0.5 part by weight of 4,4′-diphenylsulfonylazide and 3 parts by weight of purified kerosene was molded at 160°C with a press, and then the resulting matrix was subjected to partial and secondary expansions in the same manner as described in Example 32.

The resulting foam had a density of 0.15 g/cc. and a similar shape to the matrix.

Example 34

A composition of consisting of 50 parts by weight of high pressure process polyethylene, 45 parts by weight of chlorinated polyethylene (content of chlorine : 40 percent), 5 parts by weight of chlorosulfonated polyethylene, 1 part by weight of dicumyl peroxide, 10 parts by weight of azodicarbonamide and 3 parts by Table 3

| | Example 27 | Example 28 | Example 29 | Example 30 | Comparative Example 5 | Comparative Example 6 | Test Method |
|---|---|---|---|---|---|---|---|
| Amount of azodicarbonamide added (part by weight) | 5 | 15 | 25 | 35 | 5 | 15 | |
| Density | 0.094 | 0.031 | 0.018 | 0.013 | 0.105 | 0.054 | ASTMD-1667 |
| Tensile strength (Kg/cm²) | 15 | 6 | 4 | 3 | 11 | 3 | ASTMD-1564 |
| Elongation (%) | 100 | 80 | 60 | 50 | 210 | 140 | ASTMD-1564 |
| Tear strength (Kg/cm) | 5 | 2 | 1 | 0.7 | 5 | — | ASTMD-1564 |
| Compression deflection load (Kg/cm²) at 10% compression | 1.5 | 0.2 | 0.12 | 0.09 | 0.8 | 0.15 | ASTMD-1667 |
| at 25% compression | 1.8 | 0.4 | 0.24 | 0.20 | 1.2 | 0.3 | ASTMD-1667 |
| at 50% compression | 3.0 | 1.1 | 0.85 | 0.70 | 2.9 | 0.8 | ASTMD-1667 |
| Resiliency (%) | 30 | 50 | 57 | 62 | 28 | 45 | ASTMD-1564 |
| Thermal conductivity (Kcal/m²·hr·°C) | 0.037 | 0.031 | 0.030 | 0.030 | | | |
| Dielectric constant | 1.1 | 1.1 | 1.1 | 1.1 | | | |
| Tan δ (%) | 0.01 | 0.01 | 0.01 | 0.01 | | | | weight of magnesium oxide was molded into a board of 10 × 50 × 50 mm with a press, which was subsequently heated at 160°C for 10 minutes to form cross-linkage without any expansion. The obtained cross-linked matrix was subjected to partial and secondary expansions in the same manner as described in Example 11 to obtain a foam, which had a density of 0.055 g/cc. and a self fire extinguishability.

Example 35

Polyethylene foam obtained according to the invention and having a density of 0.03 g/cc. was sliced to a thickness of 5 mm, and the obtained slice was shaped by a plug type vacuum molding machine into a container having a structure as shown in FIGS. 3-A and 3-B, wherein numeral 1 shows the container, 2 the cover and 3 the groove. In the container thus obtained, even if the cover was folded 320,000 times, the groove portion did not break. The same container as in the vacuum molding can be obtained by compression molding.

Example 36

Polyethylene foams obtained according to the invention having a density of 0.03 g/cc., a tensile strength of 4.3 Kg/cm² and an elongation of 110 percent were compressed 33 percent and 66 percent by hot press at 140°C respectively and cooled while applying pressure. The foams thus obtained had the tensile strength as shown in Table 4, and they had considerably higher strength than the foams having substantially the same densities, which were not subjected to such treatment.

Table 4

|  | Density (g/cc.) | Tensile strength (Kg/cm²) | Elongation (%) |
| --- | --- | --- | --- |
| 33% compression | 0.046 | 13.2 | 190 |
| 66% compression | 0.092 | 20.5 | 210 |
| Non-treatment | 0.045 | 9 | 100 |
| Non-treatment | 0.094 | 15 | 100 |

Example 37

A foam obtained according to the invention, which had a density of 0.09 g/cc. and a resiliency of 24 percent, was put between a press, and compressed 25 percent while being heated at 90°C for 30 minutes. The foam thus compressed was left to stand for 24 hours, which was determined with respect to the resiliency to find 37 percent. The cells in the interior deformed flatly.

Example 38

The foam obtained according to the invention was compressed by hot press to obtain a shaped foam having many grooves 1 as shown in FIG. 4. The shaped foam thus obtained could be folded easily.

Example 39

Four-hundred g of a low density of polyethylene (M.I. 1.0), 68 g of azodicarbonamide and 4 g of dicumyl peroxide were thoroughly kneaded on a roll and taken out in a sheet shape, which is molded into a plate of 50 × 50 × 10 mm and this plate was cut into plates of 50 × 10 × 10 mm by a cutter (0.99 g/cc. in density). The each smaller plate was placed in an autoclave and applied to nitrogen pressure as shown in the following Table 5 and thereafter the autoclave was put in an oil bath heated at a temperature of 215°C for 80 minutes to decompose the cross-linking agent and the blowing agent and then cooled to room temperature while keeping the pressure.

The thus treated plate was heated in an oven at 140°C for 20 minutes to effect the expansion. The density of the partially expanded foams and density of the foams are shown in Table 5. The resulting foam has an average cell diameter of 25 ~ 100 microns and is smaller in the cell than that of any commercially available foam and has remarkably excellent heat insulation, resistance to moisture permeation and weather resistance. And the higher the pressure in decomposition of the blowing agent, the more fine is the cell.

Table 5

| Pressure in decomposition of the blowing agent (Kg/cm²) | Density of the partially expanded plate (g/cc.) | Expansion rate of the partially expanded plate (times) | Density of the foam (g/cc.) |
| --- | --- | --- | --- |
| 6 | 0.20 | 5.0 | 0.036 |
| 11 | 0.23 | 4.3 | 0.036 |
| 21 | 0.41 | 2.4 | 0.033 |
| 51 | 0.56 | 1.8 | 0.034 |
| 101 | 0.59 | 1.7 | 0.032 |

Example 40

One-hundred parts of acrylonitrile-styrene-butadiene resin (Abson 810 × 102, made by Goodrich), 10 parts of azodicarbonamide and 0.5 part of 1,9-nonane-bissulfonazide were homogeneously kneaded and molded into a plate of 10 × 100 × 100 mm by a press. The upper and lower surfaces of the plate were blown with hot air at 250°C for 1 minute to form a surface cross-linkage and cooled by blowing air. Then the plate was heated in an autoclave under 15 atm. of nitrogen at 200°C to effect cross-linking and partial expansion and thereafter cooled to room temperature while maintaining the pressure. This partially expanded plate was heated at 150°C for 40 minutes and the resulting foamed sheet had a density of 0.075 g/cc.

Example 41

A composition consisting of 80 parts by weight of polyethylene made by high pressure polymerization process, 20 parts by weight of butyl rubber, 20 parts by weight of azodicarbonamide and 0.8 part by weight of dicumyl peroxide was subjected to an extrusion molding into a board without decomposing the cross-linking agent and the blowing agent and then on the whole surface of the board was blown hot air at 250°C for 2 minutes to form cross-linked crust on the surface layer. The thus obtained continuous board was cooled by blowing air and cut into proper length and the cut boards were put on a heating supportor in a pressure furnace and heated at 180°C under a pressure of 10 Kg/cm² of gaseous nitrogen to decompose the cross-linking agent and the blowing agent, whereby said board was expanded several times and then the gaseous nitrogen was replaced with pressured water, while maintaining the pressure at 10 Kg/cm² to cool said board and thereafter, said board was taken out from the pressured furnace into air. Then the board was heated in an air oven at 150°C under atmospheric pressure and again expanded to obtain a foam of a rate of expansion of 37. The thus obtained foam had a similar shape to the original board and the surface was smooth and beautiful and the density was 0.025 g/cc.

Example 42

Hundred parts of polyvinyl chloride, 20 parts of dioctyl phthalate, 10 parts of isopropanol, 3 parts of zinc oxide, 20 parts of p,p'-hydroxy-bis-benzene-sulfonyl-hydrazide and 0.5 part of decane-bis-azidoformate were mixed homogeneously in a roll, and the resulting composition was shaped into a slab of 100 × 100 × 10 mm by means of a press. The slab was exposed to hot air at 200°C for 5 seconds to form a crust of cross-linkage on one surface of the slab and then put into water to cool. The slab was introduced into an autoclave by placing the crusted surface down, heated at 170°C for 1 hour under a gaseous nitrogen atmosphere of 10 atm. to decompose the cross-linking agent and the blowing agent, and then cooled to room temperature while maintaining the pressure at 10 atm. by compressed water. The thus treated slab has been partially expanded and the dimension was 170 × 170 × 16 mm. This slab was heated and expanded at 140° C for 30 minutes in an air-oven to obtain a foam having a density of 0.05 g/cc., uniform fine cells, and substantially the similar shape to the original shape of the slab.

Example 43

Hundred parts of chloroprene rubber, 5 parts of azodicarbonamide, 5 parts of a blowing assistant, 3 parts of stearic acid, 3 parts of zinc white, 3 parts of sulfur, 3 parts of tetramethylthiuram disulfide and 50 parts of carbon black were mixed homogeneously in a roll, and the resulting composition was shaped into a slab by means of a press. The upper and lower surfaces of this slab were irradiated by infrared ray to form crusted surfaces by cross-linking. The slab was heated at 140°C for 30 minutes under gaseous nitrogen of 10 atm. in an autoclave, and then cooled to 100°C. The pressure was reduced to atmospheric pressure, whereby the slab was expanded. The resulting foam had a density of 0.3 g/cc. and uniform fine cells.

Example 44

One hundred parts by wight of high pressure process polyethylene (melt index, 1.0), 0.5 part by weight of dicumyl peroxide, and 10 parts by weight of azodicarbonamide were mixed homogeneously by a mixing roll, and shaped into a sheet having a width of 400 mm and a thickness of 3 mm by means of a calender roll at 120°C. The sheet was heated uniformly at 200°C for 5 minutes and then at 230°C for 3 minutes, in an infrared ray furnace provided with an endless belt conveyor made of stainless steel screen of 50 meshes to form cross-linkage first on the exterior portions of the sheet, and then cross-linking and foaming in its interior portion.

The foamed sheet thus obtained had uniform fine cells, strong skins, flawless inside structure and a density of 0.05 g/cc. The foamed sheet was exposed to the outdoor for 1 year, and it was proved that the foamed sheet was not affected at all by the weather.

For comparison, another shaped sheet, which is not foamed was heated uniformly at 170°C for 20 minutes in the same mammer as described above, but no uniform sheet was obtained, because this sheet deformed before cross-linkage was formed on the exterior portions and stuck to the metal screen. The other shaped sheet, which is not foamed, was heated by means of the same furnace as described above, except that the endless belt of stainless steel non-porous plate was used instead of stainless steel screen, and it was found that the foamed sheet adhered to the endless belt and the blowing agent was not decomposed uniformly, thus production of a satisfactory foamed sheet was failed.

Furthermore, even when, by means of said nonporous metal belt, the upper and lower surfaces of the polyolefin sheet were heated uniformly by regulating the heating of said metal belt, the resulting foamed sheet was not satisfactory as described in the above case.

Example 45

Fourty parts by weight of high pressure process polyethylene (melt index, 1.0), 55 parts by weight of polyethylene from medium pressure polymerization process (melt index, 5.0), 5 parts by weight of polybutene (mean molecular weight, 800), 2 parts by weight of 2,-5-dimethyl-2,5-di(tert-butylperoxy) hexane, and 5 parts by weight of azodicarbonamide were mixed homogeneously, and then the resulting mixture was fed into an extruder having a T-die to shape into a sheet having a thickness of 7 mm at a temperature low enough not to decompose the organic peroxide and the blowing agent contained in the mixture. The sheet was then introduced into a hot air heating furnace provided with an endless belt conveyor made of a stainless steel plate having innumerable fine holes bored thereon and heated for 8 minutes with 200°C hot air blown from above at a rate of 5 m/sec. and from below at a rate of 10 m/sec., whereby cross-linking occurred firstly on the surface and secondly further cross-linking and foaming inside the sheet. The upper and lower slit nozzles were each spaced 200 mm from the surfaces of the sheet.

The foamed sheet thus obtained was flawless and had uniform fine cells a density of 0.12 g/cc., and a thickness as large as about 15 mm.

Example 46

Eighty parts by weight of the same high pressure process polyethylene as in Example 44, 20 parts by weight of butyl rubber (Polysar B–100, Trade Name), 1 part by weight of dicumyl peroxide, and 10 parts by weight of azodicarbonamide were mixed homogeneously and shaped into a sheet having a thickness of 3 mm by means of an extruder at a temperature low enough not to decompose the organic peroxide and the blowing agent contained in the mixture, and then the sheet was once cooled. The sheet was then cross-linked and foamed by heating 190°C, for 8 minutes in a hot air heating furnace as illustrated in the FIG. 5 provided with an endless belt conveyor made of a stainless steel screen of 80 meshes reinforced by another stainless steel screen of 10 meshes. Furthermore, the hot air rate was 5 m/sec. in this heating and both the upper and lower surfaces of the sheet were heated uniformly in such a manner that hot air blown from the slit nozzles forms opposite cross air flow. The slit nozzles were spaced 200 mm above the upper surface of the sheet, while the corresponding slit nozzles below the sheet were spaced 100 mm therefrom.

The foamed sheet thus obtained had a low water absorption, and improved elasticity and a density of 0.06 g/cc.

Example 47

Seventy parts by weight of the same high pressure process polyethylene as in Example 44, 30 parts by weight of chlorinated paraffin (chlorine content, 70 percent), 2 parts by weight of magnesium carbonate, 0.5 part by weight of dicumyl peroxide, and 5 parts by weight of p,p'-oxy-bis-benzensulfonylhydrazide were mixed homogeneously, and then shaped into a sheet having a thickness of 1 mm by means of an extruder and a T-die at a temperature low enough not to decompose the organic peroxide and the blowing agent contained in the mixture. The sheet thus prepared was foamed by heating in the same manner as described in Example 46.

The foamed sheet had a density of 0.3 g/cc., a high strength and an improved elasticity, and the sheet was difficult of combustion.

Example 48

Eighty parts by weight of the same high pressure process polyethylene as described in Example 44, 20 parts by weight of acrylonitrile-butadiene-styrene resin (Abson Resin 810 × 102, made by Goodrich Chemical Co., specific gravity of 1.04), 5 parts by weight of azodicarbonamide, 5 parts by weight of p,p'-oxy-bis-benzene-sulfonylhydrazide, and 1 part by weight of dicumyl peroxide were mixed homogeneously, and then shaped into a sheet having a thickness of 1 mm by means of an extruder and a T-die at a temperature (130°C) low enough not to decompose the organic peroxide and the blowing agent contained in the mixture.

The sheet thus prepared was foamed by heating in the same manner as described in Example 46. The foamed sheet thus obtained had a density of 0.09 g/cc. and a remarkably high mechanical strength.

Example 49

One hundred parts by weight of high pressure process polyethylene (melt index, 4), 1 part by weight of dicumyl peroxide, and azodicarbonamide in quantities as shown in the following Table 6 were mixed homogeneously, and then shaped into a sheet having a thickness of about 3 mm at a temperature low enough not to decompose the organic peroxide and the blowing agent. The sheet thus prepared was thereafter foamed by heating in the same manner as described in Example 46. The faomed sheet thus obtained had uniform fine closed cells, excellent cushionability, improved resistance against chemicals and oils, a remarkably low hygroscopicity, and the good mechanical properties as shown in the following Table 6.

Table 6

| Amount of azodicarbonamide added (part by weight) | 15 | 10 | 5 | 2.5 | |
|---|---|---|---|---|---|
| Density (g/cc.) | 0.035 | 0.051 | 0.097 | 0.20 | ASTM* D-1667 |
| Tensile strength (Kg/cm$^2$) | 3.8 | 5.5 | 10.3 | 19.5 | do. D-1564 |
| Elongation (%) | 140 | 162 | 204 | 230 | do. D-1564 |
| Tear strength (Kg/cm) | 2.1 | 3.2 | 7.0 | 13.2 | do. D-1564 |
| Compression deflection load at 10% compression (Kg/cm$^2$) | 0.21 | 0.31 | 0.80 | 1.82 | do. D-1667 |
| do.      25% | 0.35 | 0.51 | 1.20 | 2.38 | do. D-1667 |
| do.      50% | 1.03 | 1.45 | 2.9 | 5.6 | do. D-1667 |
| Resiliency (%) | 43 | 40 | 38 | 35 | do. D-1564 |

*ASTM: American Society for Testing and Materials.

Example 50

Fifty parts by weight of high pressure process polyethylene (melt index, 4.0), 50 parts by weight of ethylene-propylene copolymer (melt index, 3.5: made by Furukawa Chemical Industry Co.), 1 part by weight of dicumyl peroxide and 5 parts by weight of azodicarbonamide were mixed homogeneously and the resulting mixture was shaped at a material temperature of 130°C by an extruder into a sheet having a thickness of 3 mm. This sheet was heated for cross-linking and foaming in a hot air heating furnace maintained at 200°C, which was provided with an endless belt conveyor of stainless steel screen for 7 minutes. Furthermore, in said heating, the hot air velocity from the upper nozzle was 5 m/sec. and the velocity from the lower nozzle was 7 m/sec. and the heating was effected in such a manner that the hot air brown on the sheet forms opposite cross air flow as shown in FIG. 7. In this case, the distance from the lower surface of the sheet to the lower slit nozzle was 150 mm and the distance from the upper surface of the sheet to the upper slit nozzle was 200 mm. The density of the resulting foamed sheet was 0.10 g/cc. and the tensile strength was 14 Kg/cm$_2$, the elongation 130 percent and the compression deflection load at 50 percent compression 4 Kg/cm$^2$ and the strength is higher than that of foamed product comprising high pressure process polyethylene alone.

Example 51

Fifty parts by weight of ethylene-vinyl acetate copolymer (Elvax 250, made by DuPont), 50 parts by weight of high pressure process polyethylene (melt index, 7.0), 0.5 part by weight of dicumyl peroxide and 5 parts by weight of azodicarbonamide were mixed homogeneously and the resulting mixture was shaped at a material temperature of 130°C by an extruder into a sheet having a thickness of 2 mm.

The resulting sheet was foamed in the same manner as described in Example 50 and the resulting sheet had a density of 0.14 g/cc., an improved elasticity and remarkably excellent adhereing property and printability.

Example 52

Polyolefin foamed sheet was produced in the completely same manner as described in Example 45 and, in the cooling step, the foamed sheet was passed through between two combined rolls provided with a large number of semi-circular grooves having a radius of 7 mm to mold into string. The temperature of the foamed sheet when molding was about 130°C. The string of the foamed sheet thus obtained had a density of 0.19 g/cc. and was excellent for filler of packing.

Table 7

| Sample No. | Strength of infrared ray(v) | Conveyor velocity | Amount of gel on sheet surface before foaming * | Mesh pattern | Shape | Appearance | Density (g/cc.) |
|---|---|---|---|---|---|---|---|
| 1 | 190 | 30cm/min. | slight | non | uniform | smooth surface | 0.089 |
| 2 | 220 | 50cm/min. | do. | do. | do. | do. | 0.090 |
| 3 | 220 | 30cm/min. | small | do. | do. | do. | 0.091 |
| Control | non-irradiation | 30cm/min. | non | slightly formed | slightly non-uniform | slightly waved surface | 0.092 |

Example 53

Polyolefin foamed sheet was produced in the completely same manner as described in Example 45 and, in the cooling step, the sheet was compressed from both upper and lower surface by corrugated metal mold made of aluminum and cooled to room temperature to mold the sheet. The temperature of the foamed sheet when molding was about 150°C. The resulting corrugated foamed sheet had smooth surface and improved heat insulation, weather resistance and cushionability.

Example 54

A composition consisting of 100 parts by weight of polyethylene made by high pressure polymerization process, 5 parts by weight of azodicarbonamide, and 1 part by weight of dicumyl peroxide was molded into a sheet having a thickness of 2.5 mm through an extruder without decomposing the cross-linking agent and the blowing agent and the resulting sheet was heated, while transferring on a conveyor roll, by using four cylindrical infrared lamps (each being 750 W for 200 V, a length of 450 mm and diameter of 16 mm) provided at a position of about 30 mm above the conveyor roll in parallel, to form cross-linked crust on the upper surface of the sheet. In this case cross-linked crust was formed with respect to three samples respectively by varying the strength of the infrared ray and the velocity of the conveyor roll as shown in the following Table 7.

Then, these sample sheets were put on 25 meshes gauze conveyor, with the treated surface in contact with the conveyor, and fed into a foaming furnace, to which a hot air at 230°C was blown for about 6 minutes, whereby said sheet was foamed. As shown in the following table, when the surface of the sheet was cross-linked, no mesh pattern of the gauze developed on it and stickiness did not occur, and therefore, the resulting foamed sheet had smooth and beautiful surfaces and uniform cells.

For the comparison, the heat treatment for forming cross-linked polyethylene crust on the surface of the molded sheet was not previously effected and subsequent processes were effected in the same manner as described in the above Example 54 to form foam and the results are shown in the following Table together.

Example 55

Hundred parts by weight of stereospecific polypropylene having a melt index of 4, 5 parts by weight of white kerosene, 0.5 part by weight of 1, 10-decane-bis-sulfonazide and 10 parts by weight of azodicarbonamide were mixed homogeneously by a roll and subjected to an extrusion molding into a sheet having a thickness of 3 mm.

The resulting sheet was heated from both the upper and lower sides by means of infrared lamp as in Example 54 to form cross-linked crust and then after being cooled by air, this sheet was put on a conveyor of 25 meshes gauze and fed into a foaming furnace and blown with hot air at 230°C for about 6 minutes to form foam. As the result, said sheet did not stick with the gauze and the mesh pattern was not formed on the surface of the sheet. Moreover, the skin layer of this foam was very strong.

Example 56

A composition composed of 58 parts of ethylene/propylene rubber, 42 parts of low density polyethylene, 10 parts of azodicarbonamide, 2 parts of dicumyl peroxide, 10 parts of zinc white and 40 parts of calcium carbonate was molded into a sheet by means of an extruder. The upper and lower surfaces of this sheet were irradiated by infrared ray to form a crust by cross-linking on the surface layer. The sheet was fed into a furnace provided with a belt of 80 meshes gauze from one end, and hot air at 200°C was blown upon the sheet from the upper slit nozzle at a rate of 10 m/sec. and from the lower slit nozzle at a rate of 15 m/sec. so as to form an opposite cross air flow. The resulting foam had a strong surface and a density of 0.15 g/cc.

Example 57

A composition composed of 100 parts of polyvinyl chloride, 80 parts of dioctyl phthalate, 10 parts of azodicarbonamide, 3 parts of basic lead stearate and 0.5 part of 1,10-decane-bis-sulfonazide was molded into a sheet of 1.5 mm by means of a calender. The sheet was heated and foamed with hot air at 200°C for 3 minutes in a furnace provided with a conveyor of 80 meshes gauze. Hot air was blown upon the sheet from the upper side and the lower side so as to form an opposite cross air flow, and in order to heat the upper surface and the lower surface of the sheet uniformly the hot air was blown upon the lower surface at a velocity higher than that upon the upper surface.

The resulting foam had a strong surface and a density of 0.2 g/cc.

Example 58

Hundred parts of acrylonitrile resin (Abson 810 × 102), 5 parts of azodicarbonamide and 0.5 part of 1,9-nonanebissulfonazide were kneaded homogeneously and extruded at 170°C into a sheet of 6 mm. The sheet was heated on both the upper and lower surfaces by an infrared lamp to form cross-linked crusts. Then the thus treated sheet was placed on the screen belt and blown with hot air at 230°C for 10 minutes from both the upper and lower sides to be foamed. The resulting foamed sheet had a density of 0.18 g/cc. and an improved elasticity.

Example 59

Hundred parts of high pressure process polyethylene (1.0 MI), 10 parts of azodicarbonamide and 1 part of dicumyl peroxide were kneaded and molded into a sheet having a thickness of 5.3 mm and this sheet was blown with hot air at 210°C for the periods as shown in the following Table 8 to obtain the foamed sheet. The density was measured from whole sheet. The amount of gel were measured both exterior and interior portion of the sheet, by immersing the sheets in toluene at 100°C for 24 hours. These results show the surface cross-linking produce first and then the cross-linking and foaming proceeded simultaneously in the interior portion of the sheet.

Table 8

| Heating periods | | Density (g/cc.) | Amount of gel | |
|---|---|---|---|---|
| (min.) | (sec.) | | exterior | interior |
| | 0 | 0.977 | small amount | 0 % |
| 3 | 57 | 0.967 | do. | 0 % |
| 4 | 37 | 0.963 | do. | 0 % |
| 5 | 22 | 0.961 | do. | 1.9% |
| 5 | 45 | 0.865 | do. | 9.7% |
| 6 | 22 | 0.749 | large amount | 29.9% |
| 7 | 45 | 0.530 | do. | 60.5% |
| 8 | 23 | 0.432 | do. | 72.0% |
| 12 | 00 | 0.048 | do. | 75.0% |

We claim:

1. A process for manufacturing foamed slabs comprising (1) homogeneously mixing a foamable polyolefin, a cross-linking agent selected from the group consisting of an organic peroxide, an azido compound, sulfur and a p-quinone-dioxime and a decomposable chemical blowing agent whose decomposition temperature is equal to or above the softening temperature of the foamable polyolefin, (2) molding the resulting mixture into a slab without decomposing the cross-linking agent and the blowing agent, (3) heating the resulting slab at an elevated temperature sufficient to decompose the cross-linking agent and blowing agent while subjecting said slab to an external gas pressure of from about 5 to about 50 kg/cm² so that a partial expansion of said slab to about 1.5 to 10 times its original volume occurs, (4) reducing the elevated temperature while maintaining the pressure on the partially expanded slab containing gaseous material trapped therein to avoid substantial additional volumetric expansion, and (5) effecting further expansion at a temperature above the softening point of said foamable material at a pressure which is lower than the pressure at which said partial expansion is effected.

2. The process of claim 1 wherein said foamable polyolefin is selected from the group consisting of polyethylene, polypropylene, polybutene-1, ethylene-propylene copolymer, ethylene-butene copolymer, ethylene-styrene copolymer, ethylene-vinyl acetate copolymer, ethylene-acrylic acid copolymer, ethylene-acrylic acid ester copolymer, ethylene-acrylic acid salt copolymer, propylene-butene copolymer, copolymers thereof, terpolymers thereof, chlorinated polymers thereof, and mixtures thereof.

3. The process of claim 1, wherein said blowing agent is selected from the group consisting of p,p'-oxy-bis-benzene-sulfonyl-hydrazide, azo-di-carbonamide, di-nitrosopenta-methylene-tetramine and p-toluene sulfonyl semicarbazide.

4. The process of claim 1, wherein the slab of step 2 is substantially void free.

5. The process of claim 1, wherein the further expansion of step 5 is carried out at a temperature of from about 0° to 50° C above the softening point of said foamable polyolefin.

6. A process as defined in claim 5, wherein the further expansion of step (5) is carried out at a temperature of from about 0°–30°C higher than the softening point of said foamable material.

7. The process as defined in claim 1, wherein the surfaces only of said slab are heated strongly for a short time to a temperature of from 100°C to about 300°C and then cooled prior to heating in step (3).

8. The process as defined in claim 7 wherein the surface heating is effected by radiation, convection or conduction.

9. The processes in claim 1, wherein said molding is conducted in a press or an extruder.

10. The process as defined in claim 1, wherein said external gas pressure is provided by nitrogen, carbondioxide or steam.

11. The process as defined in claim 1, wherein said elevated temperature of step (3) is from about 140°C to 300°C and sufficient to decompose the cross-linking agent and the blowing agent simultaneously.

12. A process as defined in claim 11, wherein said elevated temperature is from about 160°C to about 240°C.

13. A process as defined in claim 1, where in step (3) is effected by two stage heating, in the first stage said elevated temperature being sufficient to decompose only said cross-linking agent and in the second stage said elevated temperature of the first stage being further elevated to decompose said blowing agent.

14. A process as defined in claim 13, wherein said blowing agent has a decomposition temperature of at least 20°C higher than that of said cross-linking agent.

15. The process as defined in claim 13, wherein said first stage heating is effected at a temperature of about 100°C to about 200°C and said second stage heating is effected at a temperature of from about 140°C to about 300°C.

16. The process as defined in claim 1, wherein in step (4), the partially expanded slab containing gaseous material trapped therein is subjected to a temperature slightly higher than the softening point of said foamable material, and in step (5) the pressure is reduced to effect the further expansion at a temperature slightly higher than the softening point of said foamable polyolefin.

17. A process as defined in claim 1, wherein step (5) is carried out a temperature of from about 100°C to about 200°C.

18. A process as defined in claim 1, wherein the further expanded slab is still further expanded at an even lower pressure.

19. A process as defined in claim 18, wherein said lower pressure is less than atmospheric pressure.

20. A process as defined in claim 1, wherein the amount of blowing agent is about 2 to about 50 parts by 100 part by weight of said foamable polyolefin.

21. A process as defined in claim 1, wherein external gas pressure is applied in a pressure vessel, characterized by multiple heating locations within said vessel.

* * * * *